US008937141B2

(12) United States Patent
Sumi et al.

(10) Patent No.: US 8,937,141 B2
(45) Date of Patent: Jan. 20, 2015

(54) MOISTURE CURABLE ORGANOPOLYSILOXANE COMPOSITION

(75) Inventors: Sumi, Bangalore (IN); Edward J. Nesakumar, Bangalore (IN); Anantharaman Dhanabalan, Bangalore (IN); Shahid Murtuza, Laurel, MD (US); Shayne J. Landon, New York, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 13/228,006

(22) Filed: Sep. 8, 2011

(65) Prior Publication Data

US 2012/0065308 A1    Mar. 15, 2012

Related U.S. Application Data

(60) Provisional application No. 61/380,849, filed on Sep. 8, 2010.

(51) Int. Cl.
*C08G 77/08* (2006.01)
*C08K 5/09* (2006.01)
*C08K 5/00* (2006.01)
*C08K 5/5419* (2006.01)
*C08L 83/04* (2006.01)
*C08K 5/49* (2006.01)

(52) U.S. Cl.
CPC ............. *C08K 5/0091* (2013.01); *C08K 5/5419* (2013.01); *C08L 83/04* (2013.01); *C08K 5/49* (2013.01)
USPC .................. 528/19; 528/14; 528/34; 524/127; 524/284; 524/296

(58) Field of Classification Search
None
See application file for complete search history.

(56) References Cited

U.S. PATENT DOCUMENTS

| 4,528,353 | A |   | 7/1985  | Lucas et al. |
| 4,537,942 | A |   | 8/1985  | Brown-Wensley et al. |
| 5,304,621 | A |   | 4/1994  | Staiger et al. |
| 5,395,860 | A |   | 3/1995  | Leung et al. |
| 5,472,987 | A |   | 12/1995 | Reedy et al. |
| 5,858,280 | A |   | 1/1999  | Zhang et al. |
| 6,162,756 | A | * | 12/2000 | Friebe et al. ............. 502/155 |
| 6,369,184 | B1 |  | 4/2002  | Bohin et al. |
| 6,911,109 | B2 |  | 6/2005  | Giroux et al. |
| 7,115,695 | B2 |  | 10/2006 | Okamoto et al. |
| 7,351,782 | B2 | * | 4/2008  | Wakabayashi et al. .......... 528/18 |
| 7,527,838 | B2 |  | 5/2009  | Correia |
| 7,541,076 | B2 |  | 6/2009  | Landon |
| 7,550,547 | B2 |  | 6/2009  | Wakabayashi et al. |
| 7,553,901 | B2 |  | 6/2009  | Horikoshi et al. |
| 7,569,653 | B2 |  | 8/2009  | Landon |
| 7,605,220 | B2 |  | 10/2009 | Wakabayashi et al. |
| 7,642,331 | B2 |  | 1/2010  | Pouchelon et al. |
| 7,732,554 | B2 |  | 6/2010  | O'Keefe et al. |
| 7,863,398 | B2 |  | 1/2011  | Devi et al. |
| 2005/0054765 | A1 | * | 3/2005 | Putzer ............................ 524/588 |
| 2006/0019398 | A1 |   | 1/2006 | Corson et al. |
| 2008/0076843 | A1 |   | 3/2008 | Clark |
| 2009/0018260 | A1 |   | 1/2009 | Correia et al. |
| 2009/0182099 | A1 |   | 7/2009 | Noro et al. |
| 2009/0186993 | A1 |   | 7/2009 | Noro et al. |
| 2010/0063215 | A1 |   | 3/2010 | Yano et al. |
| 2011/0040034 | A1 | * | 2/2011 | Maliverney et al. .......... 524/860 |

FOREIGN PATENT DOCUMENTS

| WO |    00/60010  A1 | 10/2000 |
| WO | 2009/106719 A1 | 9/2009 |
| WO | 2009/106722 A1 | 9/2009 |
| WO | WO 2009/106719 * | 9/2009 |

OTHER PUBLICATIONS

Patel et al; "Impact of thermal ageing on the tin catalyst species in room temperature vulcanised polysiloxane rubbers", Polymer Degradation and Stability, 83 (2004) pp. 157-161.
Toynbee; "Silane crosslinking of polyolefins: observations on the tin catalyst employed", Polymer, vol. 35, No. 2, 1994.
Goddard, E. Desmond and Gruber, James V., Principles of Polymer Science and Technology in Cosmetics and Personal Care, 1999, Chapter 7, Marcel Dekker, Inc., New York, New York.
International Search Report and the Written Opinion, Momentive Performance Materials Inc., Jan. 27, 2012.
Translation of Chinese Office Action, Application No. 201180053947.3, Moisture Curable Organopolysiloxane composition, dated Jul. 16, 2014.

* cited by examiner

*Primary Examiner* — Marc Zimmer
(74) *Attorney, Agent, or Firm* — Joseph E. Waters, Esq.; McDonald Hopkins LLC

(57) ABSTRACT

The present invention provides curable compositions comprising non-Sn organo-metal catalysts that accelerate the condensation curing of moisture curable silicones/non-silicones. In particular, the present invention provides Mn(III) complexes that are particularly suitable as replacements for organotin for sealant and RTV formulations. The Mn(III) complexes are comparable or superior to organotin such as DBTDL, superior to Mn(II) compounds, and exhibit certain behavior in the presence of components that allow for tuning or adjusting the cure characteristics of the present compositions and provide good adhesion and storage stability.

13 Claims, No Drawings

MOISTURE CURABLE ORGANOPOLYSILOXANE COMPOSITION

CROSS-REFERENCE TO RELATED APPLICATION

This application claims benefit from U.S. Provisional Patent Application No. 61/380,849, entitled "Moisture Curable Organopolysiloxane Composition," filed on Sep. 8, 2010, which is hereby incorporated in its entirety by reference.

FIELD

The present invention relates to curable compositions comprising curable polymers having reactive terminal silyl groups and manganese-based catalysts. In particular, the present invention provides curable compositions comprising Mn(III)-based complexes as alternatives to organotin catalysts.

BACKGROUND

Polymers having reactive terminal silyl groups or compositions comprising such polymers can be hydrolyzed and condensed in the presence of water and organometal catalysts. Suitable known catalysts for curable compositions include organometallic compounds employing metals such as Sn, Ti, Zn or Ca. Organotin compounds such as, for example, dibutyltin dilaurate (DBTDL) are widely used as condensation cure catalysts to accelerate the moisture assisted curing of a number of different polyorganosiloxanes and non-silicone polymers having reactive terminal silyl groups such as room temperature vulcanizing (RTV) formulations including RTV-1 and RTV-2 formulations. Environmental regulatory agencies and directives, however, have increased or are expected to increase restrictions on the use of organotin compounds in formulated products. For example, while formulations with greater than 0.5 wt. % dibutyltin presently require labeling as toxic with reproductive 1B classification, dibutyltin-containing formulations are proposed to be completely phased out in consumer applications during next 4-6 years.

Alternative organotin compounds such as dioctyltin compounds and dimethyltin compounds can only be considered as a short-term remedial plan, as these organotin compounds may also be regulated in the future. It would be beneficial to identify non-Sn metal catalysts that accelerate the condensation curing of moisture curable silicones and non-silicones. Desirably, substitutes for organotin catalysts should exhibit properties similar to organotin compounds in terms of curing, storage, and appearance. Non-tin catalysts would also desirably initiate the condensation reaction of the selected polymers and complete this reaction upon the surface and may be in the bulk in a desired time schedule. There are therefore many proposals for the replacement of organometallic tin compounds by other organometallic compounds. These compounds comprise metals such as Ca, Ce, Bi, Fe, Mo, Mn, Pb, Ti, V, Zn and Y. All of these metals have specific advantages and disadvantages in view of replacing tin compounds perfectly. Therefore, there is still a need to overcome some of the weaknesses of possible metal compounds as suitable catalyst for condensation cure reaction and behavior of uncured and cured compositions in particular to maintain the ability to adhere onto the surface of several substrates.

The use of manganese (II) complexes as catalysts in silicone compositions has been described. For example, U.S. Pat. No. 7,115,695 describes the use of manganese (II)-carboxylate as a catalyst for cross-linking silyl-capped organic polymers including additional promoters. U.S. Pub. No. 2008/0242825 mentions the use of a manganese catalyst in a process for endcapping polyethers with alkoxysilyl groups. U.S. Pat. No. 5,304,621 discloses the use of a manganese (II)-carboxylate compound as a condensation catalyst for polyorganosiloxanes having additional organyloxy and hydrogen groups. Other than these general teachings that group manganese complexes together, there does not appear to be any teachings that differentiate the catalytic activity exhibited by different manganese complexes.

WO 2009/106719 A1 and WO 2009/106722 A1 disclose among others, e.g., manganese (III) pentanedionate in a generic list including Bi, Ce, Fe, Mo, Yb compounds and propose the use of these complexes or complexes having additional anions as polycondensation catalysts in polyorganosiloxane compositions, whereby the use and reduction to practice is only disclosed for selected Bi, Ce, Fe, Mo, Sn complexes. The disclosed polyorganosiloxane compositions comprise either only a SiOH terminated combined with ethylsilicate as a crosslinker or a VTMO-terminated polymer, which has been cured with Bi, Ce, Fe, Mo, Sn catalysts in the presence of water or moisture. Another problem necessary to be solved in the replacement of organo-tin compounds is the property of the reactive composition to maintain its ability to cure after storage in a sealed cartridge, when exposed to humidity or ambient air.

SUMMARY

The present invention provides tin-free, curable compositions comprising silyl-terminated polymers and a non-toxic condensation catalyst based on manganese complexes. In particular, the present invention provides curable compositions employing a Mn(III)-based complex as a condensation catalyst. In one aspect, the Mn(III)-based catalysts are complexes of the Formula (1):

$$Mn^{III}Y_{3-c}A_c \qquad (1)$$

wherein Y is a chelating ligand, A is an anion, and c is a number between 0 to 2 or an integer.

In one aspect, the invention provides a curable composition exhibiting a relatively short tack-free time, curing through the bulk, as well as long storage stability in the cartridge, i.e., in the absence of humidity. The inventors have unexpectedly found that Mn(III) compounds, including compounds of formula (1), in combination with certain adhesion promoter components exhibit curing behavior similar to or even better than organotin compounds, and are therefore suitable as replacements for organotin catalysts in compositions having a reactive, silyl-terminated polymer that can undergo condensation reactions such as in RTV-1 sealant and RTV-2 formulations. Specifically, the inventors have found that Mn (III) compounds of formula (1) are comparable or superior to organotin such as DBTDL, and superior to Mn (II) complexes when the inventive additional promoters are used.

One additional requirement when using selected Mn(III)-compounds is to ensure a certain storage stability of the uncured composition in the cartridge, adhesion onto several surfaces and a cure rate in a predictable time scheme.

The inventors have also found that curable compositions employing the Mn(III) compounds and additional moderating additives exhibit superior curing behavior compared to compositions comprising Mn (II) carboxylates or pure Mn (III) complexes. Moreover, applicants have found that the combination of the Mn (III) catalysts and the additional additives may provide curable compositions allowing for a controlled curing time that is shorter or longer than that of organotin based compositions.

In one aspect, the present invention provides a curable composition comprising a moisture curable composition comprising a polymer component (A) comprising a reactive terminal silyl group; a cross-linker component (B); a catalyst component (C) comprising manganese (III) (Mn(III)) wherein the catalyst component is a compound of the formula:

$$Mn^{III}Y_{3-c}A_c$$

where in Y is a chelating ligand, A is an anion, and c is a number between 0 to 2 or an integer thereof; and 0.1 to 5 wt. % of an adhesion promoter (D).

In one aspect, the present invention provides a composition for forming a cured polymer composition comprising (A) a polymer having at least a reactive silyl group; (B) a crosslinker or chain extender chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, and combinations of two or more thereof; (C) about 0.01-7 parts per weight per 100 parts per weight of the polymer (A) of a catalyst selected from the group of organometallic compounds or salts of manganese (III) (Mn-III); (D) at least one adhesion promoter chosen from a silane or siloxane other than the compounds listed under (B); (E) optionally, a filler component; and (F) at least one acidic compound chosen from a phosphate ester, a phosphonate, a phosphite, a phosphine, a sulfite, a pseudohalogenide, a branched alkyl carboxylic acid, or a combination of two or more thereof.

According to one embodiment, the metal catalyst component (C) comprises a Mn(III) complex of the formula: $Mn^{III}Y_{3-c}A_c$, wherein Y is a chelating ligand chosen from a diketonate, a diamine, a triamine, an aminoacetate, a nitriloacetate, a bypyridin, a glyoxime, or a combination of two or more thereof; and A is an anion, and c is a number between 0 to 2 or an integer.

According to one embodiment, the chelating agent Y comprises a substituted or unsubstituted diketonate.

According to one embodiment, the anion A is chosen from a branched $C_4$-$C_{19}$-alkyl carboxylic acid, a $C_4$-$C_{12}$-alkylsulfonate, or a combination thereof.

According to one embodiment, the component (F) is chosen from a mono ester of a phosphate; a phosphonate of the formula $(R^3O)PO(OH)_2$, $(R^3O)P(OH)_2$, or $R^3P(O)(OH)_2$ where $R^3$ is a $C_1$-$C_{18}$-alkyl, a $C_2$-$C_{20}$-alkoxyalkyl, phenyl, a $C_7$-$C_{12}$-alkylaryl, a poly($C_2$-$C_4$-alkylene) oxide ester or its mixtures with diesters; a branched alkyl $C_4$-$C_{14}$-alkyl carboxylic acid; or a combination of two or more thereof.

In another aspect, the polymer (A) has the formula: $[R^1_aR^2_{3-a}Si—Z—]_n—X—Z—SiR^1_aR^2_{3-a}$. In another embodiment, X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, n is 0 to 100, a is 0 to 2, R and $R^1$ can be identical or different at the same Si-atom and chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof. In yet another aspect, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is a bond, a divalent unit selected from the group of a $C_1$-$C_8$ alkylene, or O.

According to one embodiment, the crosslinker component (B) is chosen from tetraethylorthosilicate (TEOS), a polycondensate of TEOS, methyltrimethoxysilane (MTMS), vinyltrimethoxysilane, methylvinyldimethoxysilane, dimethyldiethoxysilane, vinyltriethoxysilane, tetra-n-propylorthosilicate, vinyltris(methylethylketoxime)silane, methyltris(methylethylketoxime)silane, trisacetamidomethylsilane, bisacetamidodimethylsilane, tris(N-methyl-acetamido)methylsilane, bis(N-methylacetamido)dimethylsilane, (N-methylacetamido)methyldialkoxysilane, trisbenzamidomethylsilane, trispropenoxymethylsilane, alkyldialkoxyamidosilanes, alkylalkoxybisamidosilanes, $CH_3Si(OC_2H_5)_{1-2}(NHCOR)_{2-1}$, $(CH_3Si(OC_2H_5)(NCH_3COC_6H_5)_2$, $CH_3Si(OC_2H_5)$—$(NHCOC_6H_5)_2$, methyldimethoxy(ethylmethylketoximo)silane; methylmethoxybis(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane; ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or a combination of two or more thereof.

According to one embodiment, the adhesion promoter component (D) is chosen from an aminoalkyltrialkoxysilane, an aminoalkylalkyldialkoxysilane, a bis(alkyltrialkoxysilyl)amine, a tris(alkyltrialkoxysilyl)amine, a tris(alkyltrialkoxysilyl)cyanuarate, and a tris(alkyltrialkoxy-silyl)isocyanurate, or a combination of two or more thereof.

According to one embodiment, the composition comprises about 1 to about 10 wt. % of the crosslinker component (B) based on 100 wt. % of the polymer component (A).

According to one embodiment, the crosslinker component (B) is chosen from a silane or a siloxane, the silane or siloxane having two or more reactive groups that can undergo hydrolysis and/or condensation reaction with polymer (A) or on its own in the presence of water and component (F).

According to one embodiment, the polymer component (A) is chosen from a polyorganosiloxane comprising divalent units of the formula $[R_2SiO]$ in the backbone, wherein R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl;

a $C_7$-$C_{16}$ arylalkyl; a $C_2$-$C_4$ polyalkylene ether; or a combination of two or more thereof.

According to one embodiment, the polymer component (A) has the formula: $R^2_{3-a}R^1_aSi$—$Z$—$[R_2SiO]_x[R^1_2SiO]_y$—$Z$—$SiR^1_aR^2_{3-a}$ whereby x is 0 to 10000; y is 0 to 1000; a is 0 to 2; R is methyl. In another aspect, $R^1$ is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof, and other siloxane units may be present in amounts less than 10 mol. % preferably methyl, vinyl, phenyl. In yet another embodiment, $R^2$ is chosen from OH, a $C_1$-$C_8$-alkoxy, a $C_2$-$C_{18}$-alkoxyalkyl, an oximoalkyl, an enoxyalkyl, an aminoalkyl, a carboxyalkyl, an amidoalkyl, an amidoaryl, a carbamatoalkyl, or a combination of two or more thereof, and Z is —O—, bond, or —$C_2H_4$—.

According to one embodiment, the composition further comprises a solvent chosen from an alkylbenzene, a trialkyphosphate, a triarylphosphate, a phthalic acid ester, an arylsulfonic acid ester having a viscosity-density constant (VDC) of at least 0.86 that is miscible with a polyorganosiloxanes and catalyst component (C), a polyorganosiloxane devoid of reactive groups and having a viscosity of less than 2000 mPa·s at 25° C., or a combination of two or more thereof.

According to one embodiment, the composition is provided as a one part composition.

According to one embodiment, the composition comprises 100 pt. wt of component (A), 0.1 to about 10 pt. wt of at least one crosslinker (B), 0.01 to about 7 pt. wt. of a catalyst (C), 0.1 to about 5 pt. wt. of an adhesion promoter (D), 0 to about 300 pt. wt of component (E), 0.01 to about 8 pt. wt. of component (F) whereby this composition can be stored in the absence of humidity and is curable in the presence of humidity upon exposure to ambient air.

According to one embodiment, the composition is a two-part composition comprising: (i) a first portion comprising the polymer component (A), optionally the filler component (E), and optionally the acidic compound (F); and (ii) a second portion comprising the crosslinker (B), the catalyst component (C), the adhesive promoter (D), and the acidic compound (F), whereby (i) and (ii) are stored separately until applied for curing by mixing of the components (i) and (ii).

According to one embodiment, portion (i) comprises 100% wt of component (A), and 0 to 70 pt. wt. of component (E); and portion (ii) comprises 0.1 to 10 pt. wt. of at least one crosslinker (B), 0.01 to 7 pt. wt. of a catalyst (C), 0 to 5 pt. wt. of an adhesion promoter (D), and 0.02 to 3 pt. wt. component (F).

In another aspect, the present invention provides a method of providing a cured material comprising exposing the composition to ambient air.

According to one embodiment, a method of providing a cured material comprises combining the first portion and the second portion and curing the mixture.

According to one embodiment, the composition is stored in a sealed cartridge or flexible bag having outlet nozzles for extrusion and/or shaping of the uncured composition prior to cure.

In still another aspect, the present invention provides a cured polymer material formed from the composition.

According to one embodiment, the cured polymer material is in the form of an elastomeric or duromeric seal, an adhesive, a coating, an encapsulant, a shaped article, a mold, and an impression material.

The compositions are found to exhibit good storage stability and adhere to a variety of surfaces. In one embodiment, the curable compositions exhibit excellent adherence to thermoplastic surfaces, including polyacrylate and polymethylmethacrylate (PMMA) surfaces.

DETAILED DESCRIPTION

The present invention provides a curable composition employing a manganese (Mn(III)) complex as a condensation catalyst. The Mn(III) complexes identified in the present invention exhibit similar or superior curing properties as compared to compositions employing organotin compounds such as DBTDL in terms of accelerating moisture assisted condensation curing of silicones to result in cross-linked silicones, which can be used as sealants and RTVs (Room-Temperature Vulcanized Rubber). The non-toxic nature of these manganese compounds makes them more attractive and practical than organotin catalysts, given the forthcoming strict regulations on organotin catalysts.

It has been found that different manganese complexes exhibit a varying degree of catalytic activity, depending upon the oxidation state of manganese metal. In particular, applicants have found that Mn(III) complexes function better as catalysts as compared to Mn(II) complexes. Additionally, the ligands attached to manganese may affect the degree of catalytic activity. The Mn(III) complexes have been found to mostly work satisfactorily in most of typical sealant and RTV formulations, which additionally contain other ingredients.

In comparison to DBTDL, which is a free flowing liquid, the Mn(III) complexes are solid in nature and, hence, are usually dispersed with the aid of an organic solvent. The inventors have found that the choice of solvent may play a role in assuring uniform dispersion of catalyst, and thereby altering curing speed. Various aspects of the Mn(III) complexes are described further herein.

The present invention provides a curable composition comprising a polymer component (A) comprising a reactive terminal silyl group, a cross-linker component (B), a catalyst component (C) comprising a Mn(III)-based complex, and a adhesion promoter component (D). The compositions may further include other optional components as may be used in curable compositions such as, for example, a filler component (E), a cure rate modifying component or a stabilizer (F) for extended storage for uncured composition and/or auxiliary components (G).

The polymer component (A) may be a liquid or solid-based polymer having a reactive terminal silyl group. The polymer component (A) is not particularly limited and may be chosen from any cross-linkable polymer as may be desired for a particular purpose or intended use. Non-limiting examples of suitable polymers for the polymer component (A) include polyorganosiloxanes (A1) or organic polymers free of siloxane bonds (A2), wherein the polymers (A1) and (A2) comprise reactive terminal silyl groups. In one embodiment, the polymer component (A) may be present in an amount of from about 10 to about 90 wt. % of the curable composition. In one embodiment, the curable composition comprises about 100 pt. wt. of the polymer component (A).

As described above, the polymer component (A) may include a wide range of polyorganosiloxanes. In one embodiment, the polymer component may comprise one or more polysiloxanes and copolymers of formula (2):

(2)

$R^1$ may be chosen from saturated $C_1$-$C_{12}$ alkyl (which can be substituted with one or more of a halogen (e.g., Cl, F, O, S or N atom), $C_5$-$C_{16}$ cycloalkyl, $C_2$-$C_{12}$ alkenyl, $C_7$-$C_{16}$ arylalkyl, $C_7$-$C_{16}$ alkylaryl, phenyl, $C_2$-$C_4$ polyalkylene ether, or a combination of two or more thereof. Exemplary preferred groups are methyl, trifluoropropyl and/or phenyl groups.

$R^2$ may be a group reactive to protonated agents such as water and may be chosen from OH, $C_1$-$C_8$-alkoxy, $C_2$-$C_{18}$-alkoxyalkyl, amino, alkenyloxy, oximoalkyl, enoxyalkyl, aminoalkyl, carboxyalkyl, amidoalkyl, amidoaryl, carbamatoalkyl or a combination of two or more thereof. Exemplary groups for $R^2$ include OH, alkoxy, alkenyloxy, alkyloximo, alkylcarboxy, alkylamido, arylamido, or a combination of two or more thereof.

Z may be a bond, a divalent linking unit selected from the group of $O_{1/2}$, hydrocarbons which can contain one or more O, S or N atom, amide, urethane, ether, ester, urea units or a combination of two or more thereof. If the linking group Z is a hydrocarbon group then Z is linked to the silicon atom over a SiC bond. In one embodiment Z is chosen from a $C_1$-$C_{14}$ alkylene.

X is chosen from a polyurethane; a polyester; a polyether; a polycarbonate; a polyolefin; a polypropylene; a polyesterether; and a polyorganosiloxane having units of $R_3SiO_{1/2}$, $R_2SiO$, $RSiO_{3/2}$, and/or $SiO_{4/2}$, where R is chosen from a $C_1$-$C_{10}$-alkyl; a $C_1$-$C_{10}$ alkyl substituted with one or more of Cl, F, N, O or S; a phenyl; a $C_7$-$C_{16}$ alkylaryl; a $C_7$-$C_{16}$ arylalkyl; a $C_2$-$C_4$ polyalkylene ether; or a combination of two or more thereof X may be a divalent or multivalent polymer unit selected from the group of siloxy units linked over oxygen or hydrocarbon groups to the terminal silyl group comprising the reactive group $R^2$ as described above, polyether, alkylene, isoalkylene, polyester or polyurethane units linked over hydrocarbon groups to the silicon atom comprising one or more reactive groups $R^2$ as described above. The hydrocarbon group X can contain one or more heteroatoms such as N, S, O or P forming amides, esters, ethers urethanes, esters, ureas. In one embodiment, the average polymerization degree ($P_n$) of X should be more than 6, e.g. polyorganosiloxane units of $R_3SiO_{1/2}$, $R_2SiO$, $RSiO_{3/2}$, and/or $SiO_{4/2}$. In formula (2), n is 0-100; desirably 1, and a is 0-2, desirably 0-1.

Non-limiting examples of the components for unit X include polyoxyalkylene polymers such as polyoxyethylene, polyoxypropylene, polyoxybutylene, polyoxyethylene-polyoxypropylene copolymer, polyoxytetramethylene, or polyoxypropylene-polyoxybutylene copolymer; ethylene-propylene copolymer, polyisobutylene, polychloroprene, polyisoprene, polybutadiene, copolymer of isobutylene and isoprene, copolymers of isoprene or butadiene and acrylonitrile and/or styrene, or hydrocarbon polymer such as hydrogenated polyolefin polymers produced by hydrogenating these polyolefin polymers; polyester polymer manufactured by a condensation of dibasic acid such as adipic acid or phthalic acid and glycol, polycarbonates, or ring-opening polymerization of lactones; polyacrylic acid ester produced by radical polymerization of a monomer such as $C_2$-$C_8$-alkyl acrylates, vinyl polymers, e.g., acrylic acid ester copolymer of acrylic acid ester such as ethyl acrylate or butyl acrylate and vinyl acetate, acrylonitrile, methyl methacrylate, acrylamide or styrene; graft polymer produced by polymerizing the above organic polymer with a vinyl monomer; polysulfide polymer; polyamide polymer such as Nylon 6® produced by ring-opening polymerization of ϵ-caprolactam, Nylon 6.6 produced by polycondensation of hexamethylenediamine and adipic acid, etc., Nylon 12 produced by ring-opening polymerization of ϵ-aminolauro-lactam, copolymeric polyamides, polyurethanes, or polyureas.

Particularly suitable polymers include, but are not limited to, polysiloxanes, polyoxyalkylenes, saturated hydrocarbon polymers such as polyisobutylene, hydrogenated polybutadiene and hydrogenated polyisoprene, or polyethylene, polypropylene, polyester, polycarbonates, polyurethanes, polyurea polymers and the like. Furthermore, saturated hydrocarbon polymer, polyoxyalkylene polymer and vinyl copolymer are particularly suitable due to their low glass transition temperature which provide a high flexibility at low temperatures, i.e. below 0° C.

The reactive silyl groups in formula (2) can be introduced by employing silanes containing a functional group which has the ability to react by known methods with unsaturated hydrocarbons via hydrosilylation, or reaction of SiOH, aminoalkyl, HOOC-alkyl, HO-alkyl or HO-aryl, HS-alkyl or -aryl, Cl(O)C-alkyl or -aryl, epoxyalkyl or epoxycycloalkyl groups in the prepolymer to be linked to a reactive silyl group via condensation or ring-opening reactions. Examples of the main embodiments include the following:

(i) siloxane prepolymers having a SiOH group that can undergo a condensation reaction with a silane (L-group) $SiR^1_aR^2_{3-a}$ whereby a siloxy bond ≡Si—O—$SiR^1_aR^2_{3-a}$ is formed while the addition product of the leaving group (L-group) and hydrogen is released (L-group +H);

(ii) silanes having an unsaturated group that is capable of reacting via a hydrosilylation or a radical reaction with a SiH group or radically activated groups of a silane such as SiH or an unsaturated group; and (iii) silanes including organic or inorganic prepolymers having OH, SH, amino, epoxy, —COCl, —COOH groups, which can react complementarily with epoxy, isocyanato, OH, SH, cyanato, carboxylic halogenides, reactive alkylhalogenides, lactones, lactams, or amines, that is to link the reactive prepolymer with the organofunctional silanes to yield a silyl functional polymer.

Silanes suitable for method (i) include alkoxysilanes, especially tetraalkoxysilanes, di- and trialkoxysilanes, di- and triacetoxysilanes, di- and triketoximato-silanes, di- and trialkenyloxysilanes, di- and tricarbonamidosilanes, wherein the remaining residues at the silicon atom of the silane are substituted or unsubstituted hydrocarbons. Other non-limiting silanes for method (i) include alkyltrialkoxysilanes, such as vinyltrimethoxysilane, methyltrimethoxysilane, propyltrimethoxysilane aminoalkyltrimethoxysilane, ethyltriacetoxysilane, methyl- or propyltriacetoxysilane, methyltributanonoximosilane, methyltripropenyloxysilane, methyltribenzamidosilane, or methyltriacetamidosilane. Prepolymers suitable for reaction under method (i) are SiOH-terminated polyalkylsiloxanes, which can undergo a condensation reaction with a silane having hydrolysable groups attached to the silicon atom. Exemplary SiOH-terminated polyalkydisiloxanes include polydimethylsilaxanes.

Suitable silanes for method (ii) include alkoxysilanes, especially trialkoxysilanes ($HSi(OR)_3$) such as trimethoxysilane, triethoxysilane, methyldiethoxysilane, methyldimethoxysilane, and phenyldimethoxysilane; methyldiacetoxysilane and phenyldiacetoxysilane. Hydrogenchlorosilanes are in principle possible but are less desirable due to the additional replacement of the halogen through an alkoxy, acetyoxy group, etc. Other suitable silanes include organofunctional silanes having unsaturated groups which can be activated by radicals, such as vinyl, allyl, mercaptoalkyl or acrylic groups. Non-limiting examples include vinyltrimethoxysilane, mercaptopropyltrimethoxysilane, methyacryloxypropyltrimethoxysilane. Prepolymers suitable for reaction under method (ii) include vinyl terminated polyalkylsiloxanes, preferably polydimethylsiloxanes, hydrocarbons with unsaturated groups which can undergo hydrosilylation or can undergo radically induced grafting reactions with a corresponding organofunctional group of a silane comprising an e.g. unsaturated hydrocarbon or a —SiH group.

Another method for introducing silyl groups into hydrocarbon polymers can be the copolymerization of unsaturated hydrocarbon monomers with the unsaturated groups of silanes. The introduction of unsaturated groups into a hydrocarbon prepolymer may include, for example, the use of alkenyl halogenides as chain stopper after polymerization of the silicon free hydrocarbon moiety.

Desirable reaction products between the silanes and prepolymers include the following structures:

—SiR$_2$O—SiR$_2$—CH$_2$—CH$_2$—SiR$^1_a$R$^2_{3-a}$, or (hydrocarbon)-[Z—SiR$^1_a$R$^2_{3-a}$]$_{1-50}$ Suitable silanes for method (iii) include, but are not limited to, alkoxysilanes, especially silanes having organofunctional groups to be reactive to —OH, —SH, amino, epoxy, —COCl, or —COOH.

In one embodiment, these silanes have an isocyanatoalkyl group such as gamma-isocyanatopropyltrimethoxysilane, gamma-isocyanatopropylmethyldimethoxysilane, gamma-isocyanatopropyltriethoxysilane, gamma-glycidoxypropylethyldimethoxysilane, gamma-glycidoxypropyltrimethoxysilane, gamma-glycidoxypropyltrimethoxysilane, gamma-(3,4-epoxycyclohexyl)ethyltrimethoxysilane, epoxylimonyltrimethoxysilane, N-(2-amino ethyl)-aminopropyltrimethoxysilane gamma-aminopropyltriethoxysilane, gamma-aminopropyltrimethoxysilane, gamma-aminopropylmethyldimethoxysilane, gamma-aminopropylmethyldiethoxysilane and the like.

In one embodiment, it is desirable to select either blocked amines or isocyanates (Z'—X)$_n$—Z' for carrying out first a complete mixing and then the following coupling reaction. Examples of blocking agents are disclosed in EP 0947531 and other blocking procedures that employ heterocyclic nitrogen compounds such as caprolactam or butanone oxime, or cyclic ketones referred to in U.S. Pat. No. 6,827,875 both of which are incorporated herein by reference in their entirety.

Examples of suitable prepolymers for a reaction under method (iii) include, but are not limited to, polyalkylene oxides having OH groups, preferably with a high molecular weight (Mw) (weight average molecular weight>6000 g/mol) and a polydispersity Mw/Mn of less than 1.6; urethanes having remaining NCO groups, such as NCO functionalized polyalkylene oxides, especially blocked isocyanates. Prepolymers selected from the group of hydrocarbons having —OH, —COOH, amino, epoxy groups, which can react complementarily with an epoxy, isocyanato, amino, carboxyhalogenide or halogenalkyl group of the corresponding silane having further reactive groups useful for the final cure.

Suitable isocyanates for the introduction of a NCO group into a polyether may include tolulene diisocyanate, diphenylmethane diisocyanate, or xylene diisocyanate, or aliphatic polyisocyanate such as isophorone diisocyanate, or hexamethylene diisocyanate.

The polymerization degree of the unit X depends on the requirements of viscosity and mechanical properties of the cured product. If X is a polydimethylsiloxane unit, the average polymerization degree based on the number average molecular weight Mn is preferably 7 to 5000 siloxy units, preferably 200-2000 units. In order to achieve a sufficient tensile strength of >5 MPa, an average polymerization degree Pn of >250 is suitable whereby the polydimethylsiloxanes have a viscosity of more than 1000 mPa·s at 25° C. If X is a hydrocarbon unit other than a polysiloxane unit the viscosity with respect to the polymerization degree is much higher.

Examples of the method for synthesizing a polyoxyalkylene polymer include, but are not limited to, a polymerization method using an alkali catalyst such as KOH, a polymerization method using a transition metal compound porphyrin complex catalyst such as complex obtained by reacting an organoaluminum compound, a polymerization method using a composite metal cyanide complex catalyst disclosed, e.g., in U.S. Pat. No. 3,427,256; U.S. Pat. No. 3,427,334; U.S. Pat. No. 3,278,457; U.S. Pat. No. 3,278,458; U.S. Pat. No. 3,278,459; U.S. Pat. No. 3,427,335; U.S. Pat. No. 6,696,383; and U.S. Pat. No. 6,919,293.

If the group X is selected from hydrocarbon polymers, then polymers or copolymers having isobutylene units are particularly desirable due to its physical properties such as excellent weatherability, excellent heat resistance, and low gas and moisture permeability.

Examples of the monomers include olefins having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, β-pinene, indene, and for example but not limited to vinyltrialkoxysilanes, e.g. vinyltrimethoxysilane, vinylmethyldichlorosilane, vinyldimethylmethoxysilane, divinyldichlorosilane, divinyldimethoxysilane, allyltrichlorosilane, allylmethyldichlorosilane, allyldimethylmethoxysilane, diallyldichlorosilane, diallyldimethoxysilane, gamma-methacryloyloxypropyltrimethoxysilane, and gamma-methacryloyloxy-propyl-methyldimethoxysilane.

In one embodiment, the polymer component (A) may be a polymer of formula (3):

$$R^2_{3-a}R^1_aSi—Z—[R_2SiO]_x[R^1_2SiO]_y—Z—SiR^1_aR^2_{3-a} \qquad (3)$$

where R$^1$, R$^2$, and Z are defined as above with respect to formula (2); R is C$_1$-C$_6$-alkyl (an exemplary alkyl being methyl); a is 0-2, x is 0 to about 10,000; preferably 11 to about 2500; and y is 0 to about 1,000; preferably 0 to 500. In one embodiment, Z in a compound of formula (3) is a bond or a divalent C$_2$ to C$_{14}$-alkylene group, especially preferred is —C$_2$H$_4$—.

Non-limiting examples of suitable polysiloxane-containing polymers (A1) include, for example, silanol-stopped polydimethylsiloxane, silanol or alkoxy-stopped polyorganosiloxanes, e.g., methoxystopped polydimethylsiloxane, alkoxy-stopped polydimethylsiloxane-polydiphenylsiloxane copolymer, and silanol or alkoxy-stopped fluoroalkyl-substituted siloxanes such as poly(methyl 3,3,3-trifluoropropyl)siloxane and poly(methyl 3,3,3-trifluoropropyl)siloxane-polydimethyl siloxane copolymer. The polyorganosiloxane component (A1) may be present in an amount of about 10 to about 90 wt. % of the composition or 100 pt. wt. In one preferred embodiment, the polyorganosiloxane component has an average chain length in the range of about 10 to about 2500 siloxy units, and the viscosity is in the range of about 10 to about 500,000 mPa·s at 25 C.

Alternatively, the composition may include silyl-terminated organic polymers (A2) that are free of siloxane units, and which undergo curing by a condensation reaction comparable to that of siloxane containing polymers (A1). Similar to the polyorganosiloxane polymer (A1), the organic polymers (A2) that are suitable as the polymer component (A) include a terminal silyl group. In one embodiment, the terminal silyl group may be of the formula (4):

$$—SiR^1_aR^2_{3-d} \qquad (4)$$

where R$^1$, R$^2$, and a are as defined above.

Examples of suitable siloxane free organic polymers include, but are not limited to, silylated polyurethane (SPUR), silylated polyester, silylated polyether, silylated polycarbonate, silylated polyolefins like polyethylene, polypropylene, silylated polyesterether and combinations of two or more thereof. The siloxane-free organic polymer may be present in an amount of from about 10 to about 90 wt. % of the composition or about 100 pt. wt.

In one embodiment, the polymer component (A) may be a silylated polyurethane (SPUR). Such moisture curable compounds are known in the art in general can be obtained by various methods including (i) reacting an isocyanate-terminated polyurethane (PUR) prepolymer with a suitable silane, e.g., one possessing both hydrolyzable functionality at the silicon atom, such as, alkoxy etc., and secondly active hydrogen-containing functionality such as mercaptan, primary or secondary amine, preferably the latter, etc., or by (ii) reacting a hydroxyl-terminated PUR (polyurethane) prepolymer with a suitable isocyanate-terminated silane, e.g., one possessing one to three alkoxy groups. The details of these reactions, and those for preparing the isocyanate-terminated and hydroxyl-terminated PUR prepolymers employed therein can be found in, amongst others: U.S. Pat. Nos. 4,985,491; 5,919,888; 6,207,794; 6,303,731; 6,359,101; and 6,515,164 and published U.S. Patent Application Nos. 2004/0122253 and US 2005/0020706 (isocyanate-terminated PUR prepolymers); U.S. Pat. Nos. 3,786,081 and 4,481,367 (hydroxyl-terminated PUR prepolymers); U.S. Pat. Nos. 3,627,722; 3,632,557; 3,971,751; 5,623,044; 5,852,137; 6,197,912; and 6,310,170 (moisture-curable SPUR (silane modified/terminated polyurethane) obtained from reaction of isocyanate-terminated PUR prepolymer and reactive silane, e.g., aminoalkoxysilane); and, U.S. Pat. Nos. 4,345,053; 4,625,012; 6,833,423; and published U.S. Patent Application 2002/0198352 (moisture-curable SPUR obtained from reaction of hydroxyl-terminated PUR prepolymer and isocyanatosilane). The entire contents of the foregoing U.S. patent documents are incorporated by reference herein. Other examples of moisture curable SPUR materials include those described in U.S. Pat. No. 7,569,653, the disclosure of which is incorporated by reference in its entirety.

The polysiloxane composition may further include a crosslinker or a chain extender as component (B). In one embodiment, the crosslinker is of the formula (5):

$$R^1_a SiR^2_{4-a} \quad (5)$$

wherein $R^2$ may be as described above, $R^1$ may be as described above, and a is 0-3. Alternatively, the cross-linker component may be a condensation product of formula (5) wherein one or more but not all $R^2$ groups are hydrolyzed and released in the presence of water and then intermediate silanols undergo a condensation reaction to give a Si—O—Si bond and water. The average polymerization degree can result in a compound having 2-10 Si units.

As used herein, the term crosslinker includes a compound including an additional reactive component having at least 2 hydrolysable groups and less than 3 silicon atoms per molecule not defined under (A). In one embodiment, the crosslinker or chain extender may be chosen from an alkoxysilane, an alkoxysiloxane, an oximosilane, an oximosiloxane, an enoxysilane, an enoxysiloxane, an aminosilane, a carboxysilane, a carboxysiloxane, an alkylamidosilane, an alkylamidosiloxane, an arylamidosilane, an arylamidosiloxane, an alkoxyaminosilane, an alkaryaminosiloxane, an alkoxycarbamatosilane, an alkoxycarbamatosiloxane, an imidatosilane, a ureidosilane, an isocyanatosilane, a thioisocyanatosilane, and combinations of two or more thereof. Examples of suitable cross-linkers include, but are not limited to, tetraethylorthosilicate (TEOS); methyltrimethoxysilane (MTMS); methyltriethoxysilane; vinyltrimethoxysilane; vinyltriethoxysilane; methylphenyldimethoxysilane; 3,3,3-trifluoropropyltrimethoxysilane; methyltriacetoxysilane; vinyltriacetoxysilane; ethyltriacetoxysilane; di-butoxydiacetoxysilane; phenyltripropionoxysilane; methyltris(methylethylketoxime)silane; vinyltris(methylethylketoxime)silane; 3,3,3-trifluoropropyltris(methylethylketoxime)silane; methyltris(isopropenoxy)silane; vinyltris(isopropenoxy)silane; ethylpolysilicate; dimethyltetraacetoxydisiloxane; tetra-n-propylorthosilicate; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane. ethyldimethoxy(N-ethylpropionamido)silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or combinations of two or more thereof. The crosslinker may be present in an amount from about 1 to about 10 wt. % of the composition or from about 0.1 to about 10 pt. wt. per 100 pt. wt. of the polymer component (A).

Additional alkoxysilanes in an amount greater than 0.1 wt. % of component and (A) that are not consumed by the reaction between the prepolymer Z'—X—Z' and which comprise additional functional groups selected from $R^4$ can also work as adhesion promoter and are defined and counted under component (D).

The curable compositions further comprise an organometal catalyst (C). As described herein, the catalyst (C) comprises a Mn(III) complex. The inventors have unexpectedly found that Mn(III) complexes exhibit a superior degree of catalytic activity over other manganese complexes such as Mn or Mn(II) complexes. Mn(III) complexes are found to work satisfactorily in most of the compositions, e.g., typical sealant RTV1 or RTV2 formulations, comprising polymers having reactive terminal groups, which may additionally contain other ingredients. In comparison to DBTDL, which is a free flowing liquid, the Mn(III) complexes may be either solid or liquid in nature. In the case of solid Mn(III) complexes, these are usually dispersed with the aid of an organic solvent.

In one embodiment, the catalysts component (C) is a Mn(III) complex of the formula (1):

$$Mn^{III}Y_{3-c}A_c \quad (1)$$

wherein Y is a chelating ligand, A is an anion, and c=0-2.

The chelating ligand Y may be chosen from diketonates, diamines, triamines, aminoacetates, nitriloacteates, bipyridins, glyoximes, combinations of two or more thereof, and the like. Examples of suitable chelating ligands include, but are not limited to, acetylacetonate-2,4-pentanedione ('AA' or 'acac'); hexanedione-2,4; heptanedione-2,4; heptanedione-3,5; ethyl-3-pentanedione-2,4; methyl-5-hexanedione-2,4; octanedione-2,4; octanedione-3,5; dimethyl-5,5 hexanedione-2,4; methyl-6-heptanedione-2,4; dimethyl-2,2-nonanedione-3,5; dimethyl-2,6-heptanedione-3,5; 2-acetyl-cyclohexanone (Cy-acac); 2,2,6,6-tetramethyl-3,5-heptanedione (t-Bu-acac); 1,1,1,5,5,5-hexafluoro-2,4-pentanedione (F-acac)]; benzoylacetone; dibenzoylmethane; 3-methyl-2,4-pentadione; 3-acetyl-pentane-2-one; 3-acetyl-2-hexanone; 3-acetyl-2-heptanone; 3-acetyl-5-methyl-2-hexanone; stearoylbenzoylmethane; octanoylbenzoylmethane; 4-t-butyl-4'-methoxy-dibenzoylmethane; 4,4'-dimethoxy-dibenzoylmethane; 4,4'-di-tert-butyl-dibenzoylmethane, hexafluoroacetylacetone, or a combination of two or more thereof.

The anion A in formula (1) is not particularly limited and may be chosen from anions including, but not limited to, halides, hydroxide, oxide, peroxide, ozonide, hydrosulfide, alkoxides, alkyl thio, nitride, acetate, amide, carboxylate, cyanide, cyanate, thiocyanate, carbonate, hydrogen carbonate and the like. Some specific examples of suitable anions include, but are not limited to, $F^-$, $Cl^-$, $(I_3)^-$, $[ClF_2]^-$, $[IF_6]^-$, $(ClO)^-$, $(ClO_2)^-$, $(ClO_3)^-$, $(ClO_4)^-$, $(OH)^-$, $(SH)^-$, $(SeH)^-$, $(O_2)^-$, $(O_3)^-$, $(HS_2)^-$, $(CH_3O)^-$, $(C_2H_5O)^-$, $(C_3H_7O)^-$, $(CH_3S)^-$, $(C_2H_5S)^-$, $(C_2H_4ClO)^-$, $(C_6H_5O)^-$, $(C_6H_5S)^-$, $[C_6H_4(NO_2)O]^-$, $(HCO_2)^-$, $(C_7H_{15}CO_2)^-$, $(CH_3CO_2)^-$, $(CH_3CH_2CO_2)^-$, $(N_3)^-$, $(CN)^-$, $(NCO)^-$, $(NCS)^-$, $(NCSe)^-$, $(NH_2)^-$, $(PH_2)^-$, $(ClHN)^-$, $(Cl_2N)^-$, $(CH_3NH)^-$, $(HN=N)''$, $(H_2N-NH)^-$, $(HP=P)^-$, $(H_2PO)^-$, $(H_2PO_2)^-$, and the like. In one embodiment, the anion A is chosen from a branched $C_4$-$C_{14}$-alkyl carboxylic acid, a $C_4$-$C_{12}$-alkylsulfonate, or a combination thereof.

In one embodiment, the catalyst compound (C) comprises Mn(III) hexafluoroacetyl-acetonate (Mn(III)HFAA). In another embodiment, the catalysts component (C) comprises Mn(III) acetylacetonate (Mn(III) AA).

In one embodiment, the Mn(III) complex may be added to the composition in an amount of from about 0.01 to about 7.0 pt. wt. related to 100 part per weight of component (A). In another embodiment the Mn(III) complex may be added in an amount of from about 0.1 to about 1.0 pt. wt. In still another embodiment, the Mn(III) complex may be added in an amount of from about 0.2 to about 0.4 pt. wt. An increase in the amount of Mn(III) complex as a catalyst may increase the rate of the surface cure time and the bulk or complete cure time for the composition. Furthermore, the amount of the Mn(III) complex added to the composition may affect the viscosity of the composition. Particularly, an increase in the amount of the Mn(III) complex may increase the final viscosity of the composition.

The composition may further include an adhesion promoter component (D) that is different to component (A) or (B). In one embodiment, the adhesion promoter (D) may be an organofunctional silane comprising the group $R^4$, e.g., aminosilanes, and other silanes that are not identical to the silanes of component (B), or are present in an amount which exceeds the amount of silanes necessary for endcapping the polymer (A). The amount of non-reacted silane (B) or (D) in the reaction for making (A) can be defined in that after the endcapping reaction the free silanes are evaporated at a higher temperature up to 200° C. and vacuum up to 1 mbar to be more than 0.1 wt. % of (A).

Thus, some selected amines can advantageously be added to fine-tune the rate of Mn(III) complex catalyzed condensation curing of silicone/non-silicone polymer containing reactive silyl groups, as desired.

In one embodiment, the composition comprises an adhesion promoter (D) comprising a group $R^4$ as described by the general formula (6):

(6)

where $R^4$ is $E$-$(CR^5_2)_f$—W—$(CH_2)_f$—; $R^1$ is as described above; d is 0, 1 or 2; e=1, 2 or 3; d+e=1 to 2; and f is 0 to 8, and may be identical or different.

Non-limiting examples of suitable compounds include:

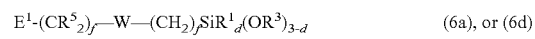

(6a), or (6d)

(6b) or (6f)

where p=2-3.

The group E may be selected from either a group $E^1$ or $E^2$. $E^1$ may be selected from a monovalent group comprising amine, —$NH_2$, —NHR, —$(NHC_2H_5)_{1-10}$NHR, $NHC_6H_5$, halogen, pseudohalogen, unsaturated aliphatic group with up to 14 carbon atoms, epoxy-group-containing aliphatic group with up to 14 carbon atoms, cyanurate-containing group, and an isocyanurate-containing group.

$E^2$ may be selected from a group comprising of a di- or multivalent group consisting of amine, polyamine, isocyanurate-containing and an isocyanurate-containing group, sulfide, sulfate, phosphate, phosphite and a polyorganosiloxane group, which can contain $R^4$ and $OR^3$ groups; W is selected from the group consisting of a single bond, a heteroatomic group selected from —COO—, —O—, epoxy, —S—, —CONH—, —HN—CO—NH— units; $R^5$ is selected from hydrogen and R as defined above, $R^1$ may be identical or different as defined above, $R^3$ is selected from the group, which consists of $C_1$-$C_8$-alkoxy, such as methoxy, ethoxy, $C_3$-$C_{12}$-alkoxyalkyl, $C_2$-$C_{22}$-alkylcarboxy and $C_4$-$C_{100}$-polyalkylene oxide may be identical or different.

Non-limiting examples of component (D) include:

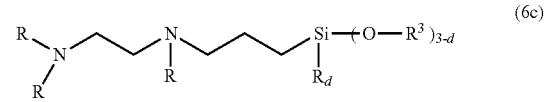

(6c)

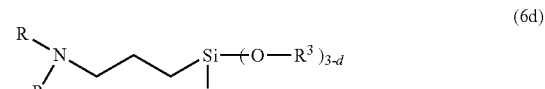

(6d)

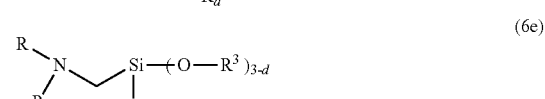

(6e)

(6f)

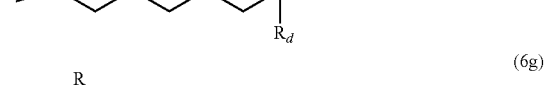

(6g)

-continued

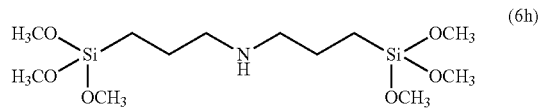
(6h)

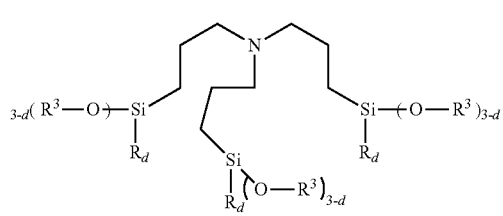
(6i)

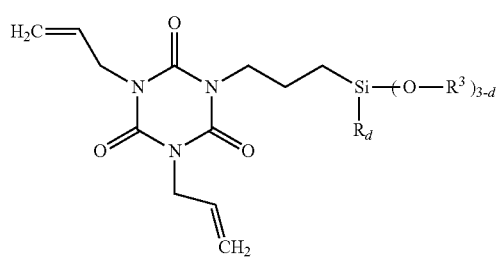
(6j)

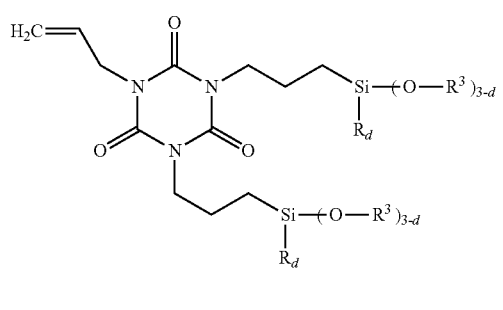
(6k)

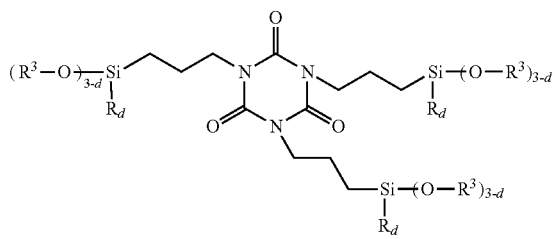
(6l)

wherein R and d are as defined above. Examples of component (D) include compounds of the formulas (6a-6k). Furthermore the formula (6b) of compounds (D) shall comprise compounds of the formula (6l):

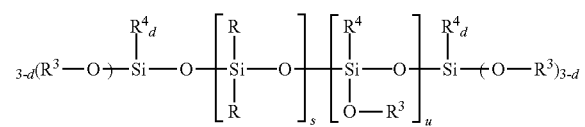
(6l)

wherein: R, $R^1$, $R^3$, and $R^4$ are as defined above; $R^6$ is hydrogen, R, linear and branched $C_3$-$C_{16}$ alkyl, $C_5$-$C_{14}$ cycloalkyl, phenyl, and phenyl substituted with $C_1$-$C_8$ alkyl; s is 0-6 (and in one embodiment desirably 0); u is 0-10 (in one embodiment desirably 0-5); and s+u is 10 or less. In one embodiment, $R^4$ is selected from:

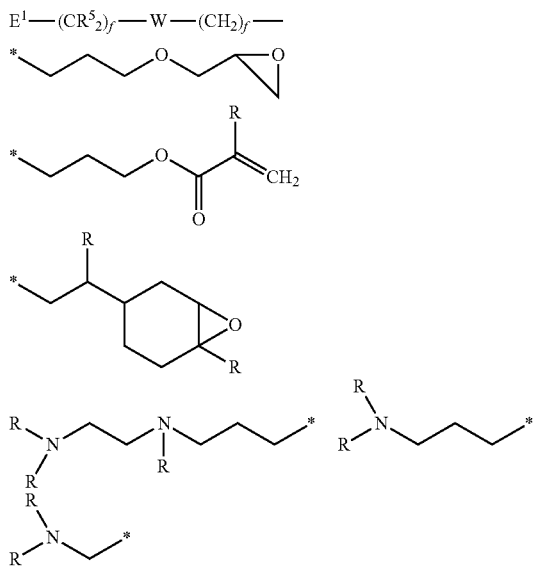

An exemplary group of adhesion promoters are selected from the group which consists of amino group-containing silane coupling agents, which can also be used as the cure rate modifying component (F). The amino group-containing silane adhesion promoter agent (D) is a compound having a group containing a silicon atom bonded to a hydrolyzable group (hereinafter referred to as a hydrolyzable group attached to the silicon atom) and an amino group. Specific examples thereof include the same silyl groups with hydrolyzable groups described above. Among these groups, the methoxy group and ethoxy group are particularly suitable. The number of the hydrolyzable groups may be 2 or more, and particularly suitable are compounds having 3 or more hydrolyzable groups.

Examples of other suitable adhesion promoter (D) include, but are not limited to N-(2-aminoethyl)aminopropyltrimethoxysilane gamma-aminopropyltriethoxysilane, gamma-aminopropyltrimethoxysilane, bis(gamma-trimethoxysilylpropyl)amine, N-phenyl-gamma-aminopropyltrimethoxysilane, triaminofunctionaltrimethoxysilane, gamma-aminopropylmethyldimethoxysilane, gamma-aminopropylmethyldiethoxysilane, methacryloxypropyltrimethoxysilane, methylaminopropyltrimethoxysilane, gamma-glycidoxypropylethyldimethoxysilane, gamma-glycidoxypropyltrimethoxysilane, gamma-glycidoxyethyltrimethoxysilane, gamma-(3,4-epoxycyclohexyl)ethyltrimethoxysilane, beta-(3,4-epoxycyclohexyl)ethylmethyl-dimethoxysilane, epoxylimonyltrimethoxysilane, isocyanatopropyltriethoxysilane, isocyanatopropyltrimethoxysilane, isocyanatopropylmethyldimethoxysilane, beta-cyano-ethyl-trimethoxysilane, gamma-acryloxypropyl-trimethoxysilane, gamma-methacryloxypropyl-methyldimethoxysilane, alpha, omega-bis-(aminoalkyl-diethoxysilyl)-polydimethylsiloxanes (Pn=1-7), alpha, omega-bis-(aminoalkyl-diethoxysilyl)-octa-methyltetrasiloxane, 4-amino-3,3-dimethyl-butyl-trimethoxysilane, and N-ethyl-3-tri-methoxy-silyl-2-methyl-propanamine, 3-(diethyl-aminopropyl)-trimethoxysilane combinations of two or more thereof, and the like. Particularly suitable adhesion promoters include bis(alkyltrialkoxysilyl)amines and tris(alkyltrialkoxysilyl)amines including, but not limited to, bis(3-propyltrimethoxysilyl)amine and tris (3-propyltrimethoxysilyl)amine.

Also it is possible to use derivatives obtained by modifying them, for example, amino-modified silyl polymer, silylated amino polymer, unsaturated aminosilane complex, phenylamino long-chain alkyl silane and aminosilylated silicone. These amino group-containing silane coupling agents may be used alone, or two or more kinds of them may be used in combination.

The curable compositions of the present invention may further comprise an alkoxysilane or blend of alkoxysilanes as an adhesion promoter (D). The adhesion promoter may be a combination blend of N-2-aminoethyl-3-aminopropyltrimethoxysilane and 1,3,5-tris(trimethoxy-silylpropyl)isocyanurate and others.

The adhesion promoter (D) may be present in an amount of from about 0.1 to about 5.0 pt. wt. based on 100 parts of the polymer component (A). In one embodiment, the adhesion promoter may be present in an amount of from about 0.15 to about 2.0 pt. wt. In another embodiment, the adhesion promoter may be present in an amount of from about 0.5 to about 1.5 pt. wt of the polymer component (A). This defines the amount of (D) in composition of (A) wherein the content of free silanes coming from the endcapping of polymer (A) is smaller than 0.1 wt. %.

The present compositions may further include a filler component (E). The filler component(s) (E) may have different functions, such as to be used as reinforcing or semi-reinforcing filler, i.e., to achieve higher tensile strength after curing having in addition the ability to increase the viscosity establish pseudoplasticity/shear thinning, and thixotropic behavior as well as non-reinforcing fillers acting mainly as a volume extender. The reinforcing fillers are characterized by having a specific surface area of more than 50 m$^2$/g related BET-surface, whereby the semi-reinforcing fillers have a specific surface area in the range of 10-50 m$^2$/g. So-called extending fillers have preferably a specific surface of less than 10 m$^2$/g according to the BET-method and an average particle diameter below 100 μm. In one embodiment of the semi-reinforcing filler is a calcium carbonate filler, the reinforcing filler is a silica filler, or a mixture thereof. Examples of suitable reinforcing fillers include, but are not limited to fumed silicas or precipitated silica, which can be partially or completely treated with organosilanes or siloxanes to make them less hydrophilic and decrease the water content or control the viscosity and storage stability of the composition. These fillers are named hydrophobic fillers. Tradenames are Aerosil®, HDK®, Cab-O—Sil® etc.

Examples of suitable extending fillers include, but are not limited to, ground silicas (Celite™), precipitated and colloidal calcium carbonates (which are optionally treated with compounds such as stearate or stearic acid); reinforcing silicas such as fumed silicas, precipitated silicas, silica gels and hydrophobized silicas and silica gels; crushed and ground quartz, cristobalite, alumina, aluminum hydroxide, titanium dioxide, zinc oxide, diatomaceous earth, iron oxide, carbon black, powdered thermoplastics such as acrylonitrile, polyethylene, polypropylene, polytetrafluoroethylene and graphite or clays such as kaolin, bentonite or montmorillonite (treated/untreated), and the like.

The type and amount of filler added depends upon the desired physical properties for the cured silicone/non-silicone composition. As such, the filler may be a single species or a mixture of two or more species. The extending fillers can be present from about 0 to about 300 wt. % of the composition related to 100 parts of component (A). The reinforcing fillers can be present from about 5 to about 60 wt. % of the composition related to 100 parts of component (A), preferably 5 to 30 wt. %.

The inventive compositions further comprise a cure rate modifying component (F) or stabilizers for an extended storage time in a sealed cartridge. The component (F) may be present in an amount of from about 0.01 to about 5 wt. % of the composition. In another embodiment 0.01 to about 8 parts per weight (pt. wt.) per 100 pt. wt. of component (A) are used, more preferably 0.02 to 3 pt. wt. per 100 pt. wt. of component (A) and most preferably 0.02 to 1 pt. wt. per 100 pt. wt. of component (A) are used. The component (F) may be chosen from compounds designated as (F1) and (F2). The compounds (F1) may be selected from primary, secondary or tertiary amines comprising saturated or unsaturated hydrocarbons, such as $C_1$-$C_{30}$-alkyl, $C_2$-$C_{30}$-alkenyl, $C_7$-C30-alkylaryl, alkylenaryl arylalkyl, $C_3$-$C_{10}$-alkylene oxide or $C_4$-$C_{300}$-polyalkylene oxide groups, which can be substituted or interrupted with one or more O-, P- and S-atoms. The cure rate modifying component (F1) may be employed to modify the rate at which the composition undergoes curing. Depending on the material employed, the cure rate modifying component may accelerate or retard curing of the composition. Thus, the cure rate modifying component may allow for control or tuning of the composition's curing characteristics.

The compounds (F2) may be an acidic compound chosen from various phosphate esters, phosphonates, phosphites, phosphines, sulfites, pseudohalogenides, branched alkyl carboxylic acids, combinations of two or more thereof, and the like. The compounds (F2) are useful as stabilizers in order to ensure a longer storage time when sealed in a cartridge before use in contact with ambient air. Especially alkoxy-terminated polysiloxanes can lose the ability to cure after storage in a cartridge and show e.g. decreased hardness under curing conditions. It is therefore desirable to add compounds of the formula (7), which can extend storage time or ability to cure over months.

$$O=P(OR^7)_{3-r}(OH)_r \qquad (7)$$

whereby r is 0, 1 or 2, and $R^7$ is selected from the group a linear or branched and optionally substituted $C_1$-$C_{30}$-alkyl groups, linear or branched, $C_5$-$C_{14}$-cycloalkyl groups, $C_6$-$C_{14}$-aryl groups, $C_6$-$C_{31}$ alkylaryl groups, linear or branched $C_2$-$C_{30}$-alkenyl groups or linear or branched $C_1$-$C_{30}$-alkoxy-alkyl groups, $C_4$-$C_{300}$-polyalkenylene oxide groups (polyethers), such as Marlophor® N5 acid, triorganylsilyl- and diorganyl ($C_1$-$C_8$)-alkoxysilyl groups. The phoshates can include also mixtures of primary and secondary esters. Non-limiting examples of suitable phosphonates include 1-hydroxyethane-(1,1-iphosphonate) (HEDP), aminotrimethylene phosphonate (ATMP), nitrolotris(methylphosphonate) (NTMP), diethylenetriaminepentakismethylene phosphonate (DTPMP), 1,2-diaminoethanetetrakismethylene phosphonate (EDTMP), and phosphonobutanetricarbonate (PBTC).

In another embodiment, a compound of the formula o=P $(OR^7)_{2-t}(OH)_t$ may be added where t is 1 or 2, and $R^7$ is as defined above or di- or multivalent hydrocarbons with one or more amino group.

Another type are phosphonic acid compounds of the formula $O=PR^7(OH)_2$ such as alkyl phosphonic acids preferably hexyl or octyl phosphonic acid.

In one embodiment, the acidic compound may be chosen from is chosen from a mono ester of a phosphate; a phosphonate of the formula $(R^3O)PO(OH)_2$, $(R^3O)P(OH)_2$, or $R^3P(O)$ (OH)$_2$ where R$^3$ is a C$_1$-C$_{18}$-alkyl, a C$_2$-C$_{20}$-alkoxyalkyl, phenyl, a C$_7$-C$_{12}$-alkylaryl, a poly(C$_2$-C$_4$-alkylene) oxide ester or its mixtures with diesters, etc.

In another embodiment, the acidic compound is a branched alkyl C$_4$-C$_{19}$-alkyl carboxylic acids, including C$_5$-C$_{19}$ acids with alpha tertiary carbon, or a combination of two or more thereof. Examples of such suitable compounds include, but are not limited to, Versatic™ Acid, Lauric Acid, Steric Acid, etc. In one embodiment, the acidic compound may be a mixture comprising branched alkyl carboxylic acids. In one embodiment, the acidic compound is a mixture of mainly tertiary aliphatic C$_{10}$ carboxylic acids.

Applicants have found that the combination of a Mn(III) catalyst and an acidic compound as the cure modifying agent may provide a curable composition that provides a cured polymer exhibiting a tack-free time, hardness, and/or cure time comparable to compositions made using tin catalysts, but that provide better adhesion compared to materials made using tin catalysts.

In one embodiment, the curable composition includes an amine compound as the cure rate modifying component. The amine compounds may be selected from a group of amines that is different than component (A), (B), (D) or (F). Amine compounds are sometimes employed as promoters to accelerate a compositions curing characteristics, even in compositions employing Mn(II) complexes as catalysts such as described in U.S. Pat. No. 7,115,695. The inventors have found, however, that amine compounds in the present compositions employing a catalyst composition comprising a Mn(III) catalyst retards the surface curing characteristics of the composition as compared to a composition employing the Mn(III)-catalyst without the cure rate modifying component, while still providing for bulk curing similar to a composition that does not include the cure rate modifying component.

Amine compounds suitable as the cure rate modifying component include, but are not limited to, aliphatic primary amines such as methylamine, ethylamine, propylamine, isopropylamine, butyl amine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilauryl amine, dicetylamine, distearylamine, methylstearylamine, ethylstearylamine, and butylstearylamine; aliphatic tertiary amines such as triethylamine, triamylamine, trihexylamine, and trioctylamine; aliphatic unsaturated amines such as triallylamine and oleylamine; aromatic amines such as laurylaniline, stearylaniline, triphenylamine, N,N-dimethylaniline, and dimethylbenzylaniline; and other amines such as monoethanolamine, diethanolamine, triethanolamine, dimethylaminoethanol, diethylenetriamine, triethylenetetramine, tetraethylenepentamine, benzylamine, diethylaminopropylamine, xylylenediamine, ethylenediamine, hexamethylenediamine, dodecamethylenediamine, dimethylethylenediamine, triethylenediamine, guanidine, diphenylguanidine, N,N,N', N'-tetramethyl-1,3-butanediamine, N,N,N',N'-tetramethylethylenediamine, 2,4,6-tris(dimethylaminomethyl)phenol, morpholine, N-methylmorpholine, 2-ethyl-4-methylimidazole, and 1,8-diazabicyclo(5,4,0)undecene-7 (DBU). Particularly preferred are amine such as N,N-dimethyldodecyl amine (DMDA); octadecylamine (stearylamine) (ODA).

The curable composition may also include auxiliary substances (G) such as plasticizers, pigments, stabilizers, antimicrobial or fungicides, biocides and/or solvents. Preferred plastizers for reactive polyorganosiloxanes (A) are selected from the group of polyorganosiloxanes having chain length of 10-300 siloxy units. Preferred are trimethylsilyl terminated polydimethylsiloxanes having a viscosity of 100-1000 mPa·s at 25° C. The choice of optional solvents (dispersion media or extenders) may have a role in assuring uniform dispersion of the catalyst, thereby altering curing speed. Such solvents include polar and non-polar solvents such as toluene, hexane, chloroform, methanol, ethanol, isopropyl alcohol, acetone, ethylmethyl ketone, dimethylformamide (DMF), dimethyl sulfoxide (DMSO). Water can be an additional component (G) to accelerate fast curing 2 part compositions RTV 2-K, whereby the water can be in one part of the 2 compositions. Particularly suitable non-polar solvents include, but are not limited to, toluene, hexane and the like if the solvents should evaporate after cure and application. In another embodiment, the solvents include high boiling hydrocarbons such as alkylbenzenes, phtalic acid esters, arylsulfonic acid esters, trialkyl- or triarylphosphate esters, which have a low vapor pressure and can extend the volume providing lower costs. Examples cited by reference may be those of U.S. Pat. No. 6,599,633; U.S. Pat. No. 4,312,801. The solvent can be present in an amount of from about 20 to about 99 wt. % of the catalyst composition.

In one embodiment, a composition in accordance with the present invention comprises: 100 pt. wt. polymer component (A); about 0.1 to about 10 pt. wt crosslinker component (B); about 0.01 to about 7 pt. wt catalyst component (C); about 0.1 to about 5, in one embodiment 0.15-1 pt. wt, of an adhesion promoter component (D); about 0 to about 300 pt. wt filler component (E); about 0.01 to about 7 pt. wt cure rate modifying component or stabilizer (F); optionally 0 to about 15 pt. wt component (G), where the pt. wt. of components (B)-(G) are each based on 100 parts of the polymer component (A).

It will be appreciated that the curable compositions may be provided as either a one-part composition or a two-part composition. A one-part composition refers to a composition comprising a mixture of the various components described above. A two-part composition may comprise a first portion and a second portion that are separately stored and subsequently mixed together just prior to application for curing. In one embodiment, a two-part composition comprises a first portion (P1) comprising a polymer component (A) and a crosslinker component (B), and a second portion (P2) comprising the catalyst component (C) comprising the Mn(III) complex. The first and second portions may include other components (F) and/or (G) as may be desired for a particular purpose or intended use. For example, in one embodiment, the first portion (P1) may optionally comprise an adhesion promoter (D) and/or a filler (E), and the second portion (P2) may optionally comprise auxiliary substances (G), a cure rate modifying component (F), and water (G).

In one embodiment, a two-part composition comprises (i) a first portion comprising the polymer component (A), optionally the filler component (E), and optionally the acidic compound (F); and (ii) a second portion comprising the crosslinker (B), the catalyst component (C), the adhesive promoter (D), and the acidic compound (F), where portions (i) and (ii) are stored separately until applied for curing by mixing of the components (i) and (ii).

The curable compositions may be used in a wide range of applications including as materials for sealing, mold making, adhesives, coatings in sanitary rooms, glazing, prototyping, joint seal between different materials, e.g. sealants between ceramic or mineral surfaces and thermoplastics, paper release, impregnation, and the like. A curable composition in accordance with the present invention comprising a Mn(III) complex as a catalyst may be suitable for a wide variety of applications such as, for example, a general purpose and industrial sealant, potting compound, caulk, adhesive or coating for construction use, insulated glass (IG), structural glazing (SSG), where glass sheets are fixed and sealed in metal frame; caulks, adhesives for metal plates, car bodies, vehicles, electronic devices and the like. Furthermore, the present composition may be used either as a one-part RTV-1K or as a two-part room temperature vulcanizing (RTV-2K) formulation which can adhere onto broad variety of metal, mineral, ceramic, rubber or plastic surfaces.

Curable compositions comprising Mn(III) catalyst compounds may be further understood with reference to the following Examples.

EXAMPLES

For example a mixture according to composition (a) is prepared by admixing of 22.5 g of silanol-stopped polydimethylsiloxane polymer (Silanol, 30,000 cps at 25° C.) as component (A) and 2.5 g of methyltrimethoxysilane (MTMS) as component (B) taken in a plastic cup was mixed thoroughly, using a Hauschild mixer for 1 min. To this mixture, the respective manganese compound as component (C) dissolved in an appropriate solvent was added. The resultant mixture was subsequently mixed in the Hauschild mixer for 1 minute. The mixed formulation was poured into a Teflon mold (length×breadth×depth~10 cm×10 cm×1 cm) placed inside a fume hood. The surface curing (Tack-free-time-TFT) and bulk curing was monitored as a function of time (maximum of 7 days).

Procedure for Making Representative Formulations (a) to (f):

Six representative formulations were made by mixing various ingredients (in parts) as given in Table 1 below.

appropriate solvent was added and the resultant mixture was mixed thoroughly in the Hauschild mixer for 2 minutes The mixed formulation was poured into a Teflon mold (length×breadth×depth~10 cm×10 cm×1 cm) placed inside a fume hood. The surface curing (TFT) and bulk curing was monitored as a function of time (maximum of 7 days). The composition (b) represents a 2 part (RTV2) composition; part P1 in this case contained all ingredients except catalyst (C); P2 was catalyst (C).

General Experimental Procedure for Evaluation in Dimethoxysilyl Stopped Polydimethylsiloxane (or) Silylated Polyurethane:

To 25 g of one of formulations (a), (e), or (0 taken in a plastic cup, the manganese compound dissolved in appropriate solvent was added and the resultant mixture was mixed thoroughly in the Hauschild mixer for 2 minutes The mixed formulation was poured into a Teflon mold (length×breadth×depth~10 cm×10 cm×1 cm) placed inside a fume hood. The surface curing (TFT) and bulk curing was monitored as a function of time (maximum of 7 days).

Measurement of Surface Curing (TFT) and Bulk Curing:

The surface cure was denoted by tack free time (TFT). In a typical TFT measurement, a stainless steel (SS) weight (weighing ~10 g) was placed on the surface of the formulation spread on the Teflon mold to infer the tackiness of the surface, as whether any material is adhered to the surface of the SS weight or not. TFT is defined as the time taken for getting a non-tacky surface. Bulk curing is the time taken for complete curing of formulation throughout the thickness (i.e. Top to bottom) and it is monitored as a function of time (visual inspection).

TABLE 1

|  | Component | A | b | c | d | E | f | g |
|---|---|---|---|---|---|---|---|---|
| Methylstopped polydimethylsiloxane, (100 cps) | G | — | — | — | 5 |  |  |  |
| Silanol-stopped polydimethylsiloxane, (3000 cps) | A | — | 65.58 | — |  |  |  |  |
| Silanol-stopped polydimethylsiloxane, (10000 cps) | A | — |  | — | 100 |  |  |  |
| Silanol-stopped polydimethylsiloxane, (30000 cps) | A | 22.5 | 7.29 | — |  |  |  |  |
| Silanol-stopped polydimethylsiloxanes-polydiphenylsiloxane copolymer, 5500 cps | A | — | — | 115 | — |  |  |  |
| Silanol-stopped polydimethylsiloxanes-polydiphenylsiloxane copolymer, 12000 cps | A | — | — | 40 | — |  |  |  |
| Dimethoxysilyl stopped polydimethylsiloxane[2] | A |  |  |  |  | 100 |  | 100 |
| Silylated polyurethane[3] | A |  |  |  |  |  | 100 |  |
| Tetraethylorthosilicate, TEOS | B | — | 3.15 | 2.33 |  |  |  |  |
| Methyltrimethoxysilane, MTMS | B | 2.5 |  |  |  |  |  | 5 |
| vinyltris(methylethylketoxime)silane | B | — | — | — | 3.3 |  |  |  |
| methyltris(methylethylketoxime)silane | B | — | — | — | 2.2 |  |  |  |
| N-(2-aminoethyl)aminopropyltrimethoxysilane | D | — | — | — | 1.4 |  |  |  |
| HMDZ treated fumed silica BET 200 m$^2$/g | E | — | — | — | 12 |  |  | 18 |
| Calcium Carbonate | E | — | 29.4 | — | — |  |  |  |
| Iron oxide | G | — | — | 88 | — |  |  |  |
| Diatomaceous earth Celite ™ | E | — | — | 28 | — |  |  |  |
| Water | G | — | 0.21 | — | — |  |  |  |

[2]Made according to Example I of U.S. Pat. No. 4,599,394;
[3]Made according to method (b) of U.S. Pat. No. 7,569,653 B2;
HMDZ = hexamethyldisilazane.

General Experimental Procedure for Evaluation in Representative Formulation:

To 50 g of one of formulations (b), (c), or (d) taken in plastic cup, the respective manganese compound dissolved in Measurement of the Storage Stability:

The ready to cure mixtures (a) to (g) in particular (e) and (g) are placed in separate sealed polyethylene cartridges in order to inhibit cure through ambient (humid) air. These cartridges were stored at 50 and 100° C. for several days. Then the compositions (a) to (g) have been released to ambient air by extrusion onto a sheet or mold out of Teflon for starting the cure reaction after storage and measuring the Tack-Free-Time, the time for completing the cure if possible and ° Shore A hardness in order to determine, to what extent the compositions maintained performance after storage under accelerated conditions. The increased temperature for the storage test should simulate the storage effect at room temperature (25° C. 50% relative humidity) over longer times in a kind of time lapse.

Screening of Manganese Compounds:

Several metal compounds were screened as catalysts. The typical screening experiment involves model formulations containing a silanol terminated polydimethylsiloxane as component (A), crosslinker as component (B) and catalyst (C) for manufacture formulation (a). Accordingly the other formulations (b) to (f) are made selecting other polymer components (A) as shown in table 1. The catalyst was typically added at 2 loadings. The surface cure time (TFT) and bulk/complete curing were used as a screening parameter to down select the effective catalyst. The screening results are tabulated below. From the screening experiments, the inventors found that the Mn(III) complexes as component (C) were superior to other manganese complexes. As shown in Table 2, the reactivity order for the tested complexes is Mn(III) AA>Mn(III)TMH>Mn(II)AA>>Mn(II)HFAA, Mn2-EH, MnNaph (abbreviations at the end of table 2).

Manganese compounds having different oxidation states and containing different ligand groups were screened. Among the six manganese compounds screened the result showed the Mn(III)AA had TFT of 2 min and completely cured in 1 day (Examples 9-10) while DBTDL had TFT of 14 min and completely cured in 1 day (comparative example C1 and C2). The present results show that the manganese (III) (Examples 9-10) has better catalytic activity compare to manganese (II). Between the two manganese (III) compounds screened the results show that the Mn(III)AA has higher catalytic activity compare to Mn(III)TMH (Examples 9-12). Among the acetylacetonates, the results showed that the manganese (III) has higher catalytic activity compared to manganese (II) compounds (Examples 5-6, 9-10). Mn(III)AA had a TFT of 2 min and completely cured in 1 day (Examples 9-10) while the Mn(II)AA containing formulations are partially cured in 7 days (Examples 5-6). Among the different Mn(II) compounds, the results showed Mn(II)AA has little catalytic activity while others are inactive in the concentration tried.

TABLE 2

| Example | Catalyst | Catalyst amount (in g) | TFT [min] | Color of formulation | Complete Curing after n days |
|---------|----------|------------------------|-----------|---------------------|------------------------------|
| C1 | DBTDL | 0.2 | 14 | Colorless | 1 |
| C2 | DBTDL | 0.4 | 14 | Colorless | 1 |
| 1 | MnNaph | 0.2 | — | Peach | >7* |
| 2 | MnNaph | 0.4 | — | Peach | >7* |
| 3 | Mn2-EH | 0.2 | — | Peach orange | >7* |
| 4 | Mn2-EH | 0.4 | — | Peach orange | >7* |
| 5 | Mn(II)AA | 0.2 | — | Blackish brown | >7** |
| 6 | Mn(II)AA | 0.4 | — | Blackish brown | >7** |
| 7 | Mn(II)HFAA | 0.2 | — | Pale yellow | >7* |
| 8 | Mn(II)HFAA | 0.4 | — | Yellow | >7* |
| 9 | Mn(III)AA | 0.2 | 2 | Brown | 1 |
| 10 | Mn(III)AA | 0.4 | 2 | Brown | 1 |
| 11 | Mn(III)TMH | 0.2 | 300 | Blackish brown | 2 |
| 12 | Mn(III)TMH | 0.4 | 330 | Blackish brown | 2 |

Catalyst weight per 100 g of formulation (a)

C1; C2 = comparison examples

*did not cure

**partially cured

MnNaph—Manganese (II)naphthenate

Mn2-EH—Manganese (II) 2-ethylhexanoate

Mn(II)AA—Manganese(II) acetylacetonate

Mn(II)HFAA—Manganese(II) hexafluoroacetylacetonate

Mn(III)AA—Manganese(III) acetylacetonate

Mn(III)TMH—Tris(2,2,6,6-tetramethyl-3,5-heptanedionato)manganese(III)

Evaluation of Mn(III)AA in Representative Formulations:

Mn(III)AA of example 9 compared to Mn (II)AA of example 5 shows a shorter TFT and shorter time for complete cure, and was found to be one of the effective catalysts among different manganese complexes screened. Mn(III)AA is evaluated in selected representative formulations. (The formulation details of (a) (b), (c), (d), (e) and (f) are identified in Table 1 above). Table 3 below summarizes the results.

TABLE 3

| Example | Formulation 100 g | Catalyst | Catalyst amount (in g) | TFT [min] | Color of formulation | Color after cure | Complete Curing after [days] |
|---------|-------------------|----------|------------------------|-----------|---------------------|------------------|------------------------------|
| C1 | a | DBTDL | 0.2 | 14 | Colorless | Colorless | 1 |
| C2 | a | DBTDL | 0.4 | 14 | Colorless | Colorless | 1 |
| 9 | a | Mn(III)AA | 0.2 | 2 | Brown | Brown | 1 |
| 10 | a | Mn(III)AA | 0.4 | 2 | Brown | Brown | 1 |
| C3 | b | DBTDL | 0.1 | 480 | White | White | 1 |
| C4 | b | DBTDL | 0.2 | 300 | White | White | 1 |
| 13 | b | Mn(III)AA | 0.1 | 2880 | Grey | Grey | >7 * |
| 14 | b | Mn(III)AA | 0.2 | <1440 | Grey | Grey | 1 ** |
| C5 | c | DBTDL | 0.2 | 240 | Red | Red | 1 |
| C6 | c | DBTDL | 0.4 | 180 | Red | Red | 1 |
| 15 | c | Mn(III)AA | 0.2 | — | Red | Red | 1 ** |
| 16 | c | Mn(III)AA | 0.4 | 120 | Red | Red | 1 |
| C7 | d | DBTDL | 0.02 | 10 | Translucent | White | 3 [3] |
| C8 | d | DBTDL | 0.1 | 10 | Translucent | White | 3 [3] |
| C9 | d | DBTDL | 0.2 | 5 | Translucent | White | 3 [3] |
| 17 | d | Mn(III)AA | 0.1 | 50 | Pale brown | Tan | 3 [3] |
| 18 | d | Mn(III)AA | 0.2 | 45 | Brown | Tan | 2 [3] |
| C10 | e | DBTDL | 0.2 | 1200 | Translucent | Colorless | 1 |

TABLE 3-continued

| Example | Formulation 100 g | Catalyst | Catalyst amount (in g) | TFT [min] | Color of formulation | Color after cure | Complete Curing after [days] |
|---|---|---|---|---|---|---|---|
| C11 | e | DBTDL | 0.4 | 300 | Translucent | Colorless | 1 |
| 19 | e | Mn(III)AA | 0.2 | — | Brown | — | >7 [4] |
| 20 | e | Mn(III)AA | 0.4 | — | Brown | — | >7 [4] |
| C12 | f | DBTDL | 0.4 | 120 | Colorless | Colorless | 2 |
| C13 | f | DBTDL | 0.8 | 120 | Colorless | Colorless | 1 |
| 21 | f | Mn(III)AA | 0.4 | 60 | Blackish brown | Pale brown | 1 |
| 22 | f | Mn(III)AA | 0.8 | 240 | Blackish brown | Brown | 1 |

* some uncured at the bottom
** sticky
2.5 mm thickness
[3] 1 cm thickness
[4] did not cure Comparative Examples C1-C2 describe evaluation of formulation (a) with DBTDL and Examples 9-10 describe evaluation with Mn(III)AA. While the DBTDL containing formulations had a TFT of 14 minutes, the Mn(III)AA containing formulations had a TFT of 2 minutes. The bulk curing characteristics of both the DBTDL and the Mn(III)AA containing formulations are found to be comparable.

Comparative Examples C3-C4 and Examples 13-14 describe evaluation in formulation (b). While, the TFT observed for DBTDL catalyzed curing is typically in the range of 5-8 hours, a complete curing is evident in a day. In comparison, a retardation of curing is evident in case of Mn(III)AA containing formulation (Examples 13-14), as it is evident from a significantly higher TFT (24 hours to 48 hours) and such observation is related to the presence of water (which is added to accelerate the organotin catalyzed moisture curing) in formulation (b). Hence, it appears that with the use of Mn(III)AA as a condensation cure catalyst, the necessity of faster cure speed may be achieved with the employment of higher loading of the catalyst and not with the addition of water. Similarly, DBTDL containing formulation (c) had a TFT of 3-4 hours and complete bulk cure time of 1 day (Comparative Examples 5-6). Mn(III)AA containing formulation (c) had TFT in the range of 120 min and completely cured in 1 day (Examples 15-16). While the TFT of DBTDL containing formulation (d) (Comparative Examples 7-9) are in the range of 5-10 min and for the complete bulk curing typically takes 3 days. In comparison, the TFT values observed for Mn(III)AA containing formulation (d) (Examples 17-18) are around 45-50 min, and the complete bulk curing is evident in 2-3 days.

With respect to moisture curing of dimethoxysilyl stopped polydimethylsiloxane (formulation (e)), the Mn(III)AA containing formulations did not exhibit any curing and such behavior is rather rationalized to the presence of amine impurities present in the dimethoxysilyl stopped polydimethylsiloxane and no additional crosslinker (B) was used (Examples 19-20). Experiments with Mn(III)AA in non-silicone resin (formulation (1), silylated polyurethane (SPUR)) showed TFT~60-240 min and complete cure in 1 day (Examples 21-22) as compare to DBTDL having TFT of 2 hours and complete cure in 1 day (Comparative Examples 12-13).

Comparative Example 14 (C14)

A mixture of 6.2 g monooctyl phosphate (component (F)) and 8 g methyltrimethoxysilane (component (B)) was taken in an internal mixer and thoroughly mixed for a period of 5 minutes after which 100 g of a —Si(CH$_3$)$_2$OH-capped poly-dimethylsiloxane (component (A); RTV 89165 supplied by Momentive Performance Materials) 50 Pa·s (25° C.) was added and admixed for a period of 10 minutes. At the end of the mixing step, the viscosity of the mixture increased abruptly to a more viscoelastic behaviour. After the addition of 0.2 g methanol component (component (G)), the viscosity decreased.

The resulting alkoxysilyl modified polymer was cooled down to 30° C. in a Ross double planetary mixer kettle, and a portion of this polymer was admixed with a crosslinker (component (B)), bis(3-propyltrimethoxysilyl)amine as adhesion promoter (component (D)), the trimethylsilyl stopped PDMS as a plasticizer as component (G), hydrophobic fumed silica (BET specific surface area of about 110 m$^2$/g Aerosil® R972 supplied by Evonik) as component (E), and dibutyltin dilaurate (DBTDL) as a catalyst (component (C)) in the ratio listed in table 4. The reactive mixture was stored under dry nitrogen in a closed container (cartridge with nozzle) prior to cure or submitted to heat ageing for the simulation of storage stability (shelf life time) under accelerated test conditions.

For measuring the cure and hardness properties the composition is discharged by extruding the reactive composition into a Teflon mold having a cavity height of 10 mm. The molds are exposed to ambient air having about 50% humidity at 25° C. in order to start continuous cure.

Example 23

Example 23 was prepared using the procedure of Comparative Example C14 except that the DBTL catalyst compound of Comparative Example C14 was replaced with manganese (III) acetylacetonate as the catalyst component (C).

Comparative Examples 15 (C15) and 16 (C16)

Comparative Examples 15 and 16 are examples that omit the acidic additive (F). Comparative Example 15 was prepared by adding 39.6 g methyltrimethoxysilane (component (B)) to 960 g —Si(CH$_3$)$_2$OH-capped polydimethylsiloxane (component (A)) at 50 Pa·s (25° C.) in a Ross double planetary mixer kettle at room temperature (25° C.) and stirred for 20 minutes. Dibutylamine (0.6 g) was then added to the mixer, and mixing was continued for another 20 minutes. The end-capping process was stopped by the addition of formic acid (0.2 g). The mixture was stirred and heated up to 60° C. and kept at that temperature for 90 minutes. The temperature of the mixture was subsequently raised up to 100° C. and kept at that temperature for another 90 minutes before removing the volatile by-products with the application of vacuum for a period of 60 minutes.

In a next step this alkoxysilyl modified polymer was cooled down to 30° C. in the Ross double planetary mixer kettle and a portion of this polymer was admixed with a crosslinker (component (B)), bis(3-propyltrimethoxysilyl)amine as adhesion promoter (component (D)), the trimethylsilyl stopped PDMS as a plasticizer (component (G)), hydrophobic fumed silica (BET specific surface area of about 110 m²/g—Aerosil® R972 supplied by Evonik) as a filler component (E), and dibutyltin dilaurate (DBTDL) as a catalyst (component (C)) in the ratio listed in table 4. The reactive mixture was stored under dry nitrogen in a closed cartridge with nozzle prior to cure.

Comparative Example C16 was prepared in the same manner as Comparative Example C15 except that the DBTDL catalyst compound was replaced with manganese (III) acetylacetonate as component (C).

TABLE 4

| Formulations | C14 | Ex. 23 | C15 | C16 |
|---|---|---|---|---|
| Dimethoxysilyl stopped PDMS | — | — | 56.2 | 56.2 |
| Dimethoxysilyl stopped PDMS | 56.2 | 56.2 | — | — |
| Monooctylphosphate | 0.25 | 0.25 | — | — |
| Methyl stopped PDMS (100 mPa · s) | 28.4 | 28.4 | 28.4 | 28.4 |
| Methyltrimethoxysilane | 2.9 | 2.9 | 2.9 | 2.9 |
| Dibutyltin dilaurate (DBTDL) | 0.4 | — | 0.4 | — |
| Mn(III)-acetylacetonate | — | 0.4 | — | 0.4 |
| Methanol | 0.2 | 0.2 | — | — |
| Bis(3-propyltrimethoxysilyl)amine | 0.8 | 0.8 | 0.8 | 0.8 |
| Aerosil silica R972 | 10 | 10 | 10 | 10 |
| Properties | | | | |
| Tack-free time immediately after mixing (min.) | 66 | 100 | 50 | 110 |
| Bulk cure time immediately after mixing (h) | 24 | 30 | 24 | >48 |
| Tack-free time after ageing at 100° C. for 15 days (min) | 60 | 80 | 20 | Gel formation |
| Bulk cure time after ageing at 100° C. for 15 days (h) | >24 | >24 | >24 | Gel formation |

Discussion of the Results in Table 4

The example in accordance with aspects of the invention using the Mn-(III) acetylacetonate catalyst compound component (C)) together with the phosphate ester (component (F)) shows a sufficient short Tack-Free-Time (TFT) and a short time for curing through the bulk, The ability to cure i.e. TFT and bulk cure time can be maintained even after storage over 15 days at 100° C. of the uncured material in a sealed cartridge, whereas Comparative Example 16 that does not include the phosphate ester (as component (F)) shows some weakness in curing after storage at 100° C. only a gel-like stage could be achieved in 24 h. Example 23 further illustrates that the tin catalyst can be replaced by Mn catalyst.

Examples 24-26 and Comparative Examples C17-C20

Examples 24-26 and Comparative Examples C17-C20 were prepared as RTV-2K-composition including a first part made in a Ross double planetary mixer kettle at room temperature (25° C.) by mixing 663.3 g of a SiOH terminated polydimethylsiloxane (component (A)) having a viscosity of 4 Pa·s (25° C.) together with 333.3 g of surface treated fumed silica as a filler component (E).

The second part of the RTV-2K-composition was prepared in a 250 mL glass bulb, whereby 100 g of a polyethylsilicate as a crosslinker (component (P2)) was mixed with 10 g of a catalyst (component (C)), and 50 g bis(3-propyltrimethoxysilyl)amine (component (D)) following the individual ratios shown in table 5. Examples 24-26 include 3 g of an acidic component (component (F)), which is one of Versatic™ Acid 10 from Momentive Performance Materials Inc., lauric acid, and steric acid, whereby example 24 shows adhesion to Al and glass and the shortest TFT. Comparative Examples C17, C19, and C20 did not include an acidic compound, and C19 did not include Bis(3-propyltrimethoxysilyl)amine. The TFT for C19/C20 at 25° C. are 90/120 min and after heat ageing 70° C. 5 days 190/240 min.

The first and second parts are stored in closed containers e.g. metal or plastic cans until use for testing purposes. For measuring the cure and hardness properties, the first and second parts are mixed together in a ratio of 100:1.6/1.63 with a spatula and then poured in a plastic mold having a cavity height of 10 mm. The molds are exposed to ambient air having about 50% humidity at 25° C. in order to start continuous cure. For simulated shelf life tests for the closed metal cans that contain second part P2 are exposed to the ageing conditions for the given temperatures of table 5 and unified by mixing in ratios following table 5.

TABLE 5

| Formulations | | C17 | C18 | C19 | C20 | Ex-24 | EX-25 | EX-26 |
|---|---|---|---|---|---|---|---|---|
| Part 1 (P1) | | | | | | | | |
| OH-end capped PDMS | | 66.3 | 66.3 | 66.3 | 66.3 | 66.3 | 66.3 | 66.3 |
| Treated fumed silica | | 33.3 | 33.3 | 33.3 | 33.3 | 33.3 | 33.3 | 33.3 |
| Part 2 (P2) | | | | | | | | |
| Ethyl polysillicate | | 1 | 1 | 1 | 1 | 1 | 1 | 1 |
| Dibutyltin dilaurate | | 0.1 | 0.1 | | | | | |
| Mn(III)-acetylacetonate | | | | 0.1 | 0.1 | 0.1 | 0.1 | 0.1 |
| Versatic acid | | | 0.03 | | | 0.03 | | |
| Lauric acid | | | | | | | 0.03 | |
| Steric acid | | | | | | | | 0.03 |
| Bis(3-propyltrimethoxysilyl)amine | | 0.5 | 0.5 | | 0.5 | 0.5 | 0.5 | 0.5 |
| Properties | | | | | | | | |
| Tack-free time (min) - immediately after mixing P1 and P2 | [min] | 13 | 11 | 90 | 120 | 13 | 20 | 23 |
| Bulk care time (h) - immediately after mixing P1 and P2 | [h] | 6 | 6 | 12 | 48 | 6 | 8 | 8 |
| Shore-A hardness (top/bottom) - immediately after mixing P1 and P2 | ° Shore A | 58/60 | 50/55 | 20/10 | 30/35 | 60/57 | 60/57 | 60/57 |

TABLE 5-continued

| Formulations | | C17 | C18 | C19 | C20 | Ex-24 | EX-25 | EX-26 |
|---|---|---|---|---|---|---|---|---|
| Tack-free time (min) - after ageing at 70° C. for 5 days | [min] | 17 | 15 | 190 | 240 | 42 | 100 | 110 |
| Bulk cure time (h) - after ageing at 70° C. for 5 days | [h] | 6 | 6 | 48 | 52 | 10 | 48 | 48 |
| Shore-A hardness (top/bottom) - after ageing at 70° C. for 5 days | ° Shore A | 52/50 | 50/48 | 20/12 | 30/32 | 40/45 | 25/28 | 20/25 |
| Adhesion to PVC | | x | x | | | x | x | x |
| Adhesion to Glass | | x | x | | | + | + | + |
| Adhesion to PMMA | | x | x | | | x | x | x |
| Adhesion to Aluminum | | x | x | | | + | + | + | x—No adhesion; +—Good adhesion

Discussion of the Results of Table 5

Examples 24-26 shows that the cure behaviour of a RT2K compositions wherein the tin catalysts is replaced by a Mn(III)-acetylacetoante catalyst and an acidic compound achieve a comparable sufficient degree of cure rate and a high crosslinking density expressed e.g. by hardness, whereby the adhesion properties are improved when measured in contact to glass and aluminum. In particular example 24 wherein the Versatic Acid was used the properties are close to the examples using the tin catalyst DBTDL. The adhesion promoter of Example 24 works better together with Mn catalyst than together with the tin catalyst of Comparative Example C18 when the Versatic acid is also used.

The ability to cure can be maintained even after heat ageing of the uncured composition at 70° C. for 5 days whereby this test is used as accelerated shelf-life test. The Mn(III) acetylacetonate catalyst shows the shortest curing times measure as TFT as well for the curing through the bulk if Versatic Acid is used (Example 24). If the Mn(III) is used together with the adhesion promoter absent the acidic compound as shown in Comparative Example C20, the cure time is enlarged.

Embodiments of the invention have been described above and modifications and alterations may occur to others upon the reading and understanding of this specification. The claims as follows are intended to include all modifications and alterations insofar as they come within the scope of the claims or the equivalent thereof.

We claim:

1. A composition for forming a cured polymer composition comprising:

100 pt. wt of component (A) of formula

$$R^2_{3-a}R^1_aSi-Z-[R_2SiO]_x[R^1_2SiO]_y-Z-SiR^1_aR^2_{3-a}$$

whereby
x is 0 to 10000;
y is 0 to 1000;
a is 0 to 2;
R is methyl;
$R^1$ is chosen from a $C_1$-$C_{10}$-alkyl; a $C_1$-$C_{10}$ alkyl substituted with one or more of Cl, F, N, O or S; a phenyl; or a combination of two or more thereof, and other siloxane units may be present in amounts less than 10 mol. % preferably methyl, vinyl, phenyl;
$R^2$ is chosen from OH, a $C_1$-$C_8$-alkoxy, a $C_2$-$C_{18}$-alkoxyalkyl, or a combination thereof, and
Z is —O—, bond, or —$C_2H_4$—, 0.1 to about 10 pt. wt of at least one crosslinker (B) selected from a silane, the silane having two or more reactive groups and combinations thereof, 0.01 to about 7 pt. wt. of a catalyst (C) comprises a Mn(III) complex of the formula:

$$Mn^{III}Y_3$$

wherein Y is a chelating ligand is a diketonate, 0.1 to about 5 pt. wt. of an adhesion promoter (D) selected from an aminoalkyltrialkoxysilane, an aminoalkylalkyldialkoxysilane, a bis(alkyl-trialkoxysilyl)amine, a tris (alkyltrialkoxysilyl)amine or a combination thereof, 0 to about 300 pt. wt of component (E) a filler component, 0.01 to about 1.0 pt. wt. of component (F) branched alkyl carboxylic acid, whereby the composition are stored in the absence of humidity and is curable in the presence of humidity upon exposure to ambient air.

2. The composition of claim 1, wherein the component (F) is chosen from a branched alkyl $C_4$-$C_{14}$-alkyl carboxylic acids or a combination of two or more thereof.

3. The composition of claim 1, wherein the crosslinker component (B) is chosen from tetraethylorthosilicate (TEOS), a polycondensate of TEOS; methyltrimethoxysilane (MTMS); a polycondensate of MTMS vinyl-trimethoxysilane; methylvinyldimethoxysilane; dimethyldiethoxysilane; vinyltriethoxysilane; tetra-n-propylorthosilicate; vinyltris(methylethylketoxime)silane; methyltris(methylethylketoxime)silane; trisacetamidomethylsilane; bisacetamidodimethylsilane; tris(N-methyl-acetamido)methylsilane; bis(N-methylacetamido)dimethylsilane; (N-methyl-acetamido)methyldialkoxysilane; trisbenzamidomethylsilane; trispropenoxymethylsilane; alkyldialkoxyamidosilanes; alkylalkoxybisamidosilanes; $CH_3Si(OC_2H_5)_{1-2}$(NHCOR)$_{2-1}$; $(CH_3Si(OC_2H_5)(NCH_3COC_6H_5)_2$, $CH_3Si(OC_2H_5)$—$(NHCOC_6H_5)_2$; methyldimethoxy(ethylmethylketoximo)silane; methylmethoxybis-(ethylmethylketoximo)silane; methyldimethoxy(acetaldoximo)silane; methyldimethoxy(N-methylcarbamato)silane; ethyldimethoxy(N-methylcarbamato)silane; methyldimethoxyisopropenoxysilane; trimethoxyisopropenoxysilane; methyltri-iso-propenoxysilane; methyldimethoxy(but-2-ene-2-oxy)silane; methyldimethoxy(1-phenylethenoxy)silane; methyldimethoxy-2(1-carboethoxypropenoxy)silane; methylmethoxydi-N-methylaminosilane; vinyldimethoxymethylaminosilane; tetra-N,N-diethylaminosilane; methyldimethoxymethylaminosilane; methyltricyclohexylaminosilane; methyldimethoxyethylaminosilane; dimethyldi-N,N-dimethylaminosilane; methyldimethoxyisopropylaminosilane dimethyldi-N,N-diethylaminosilane; ethyldimethoxy(N-ethylpropionamido) silane; methyldimethoxy(N-methylacetamido)silane; methyltris(N-methylacetamido)silane; ethyldimethoxy(N-methylacetamido)silane; methyltris(N-methylbenzamido)silane; methylmethoxybis(N-methylacetamido)silane; methyldimethoxy(caprolactamo)silane; trimethoxy(N-methylacetamido)silane; methyldimethoxyethylacetimidatosilane; methyldimethoxypropylacetimidatosilane; methyldimethoxy(N,N',N'-trimethylureido)silane; methyldimethoxy(N-allyl-N',N'-dimethylureido)silane; methyldimethoxy(N-phenyl-N',N'-dimethylureido)silane; methyldimethoxyisocyanatosilane; dimethoxydiisocyanatosilane; methyldimethoxythioisocyanatosilane; methylmethoxydithioisocyanatosilane, or a combination of two or more thereof.

4. The composition of claim 1, comprising about 1 to about 10 wt. % of the crosslinker component (B) based on 100 wt. % of the polymer component (A).

5. The composition of claim 1, wherein the crosslinker component (B) is chosen from a silane or a siloxane, the silane or siloxane having two or more reactive groups that can undergo hydrolysis and/or condensation reaction with polymer (A) or on its own in the presence of water and component (F).

6. The composition of claim 1 further comprising a solvent chosen from an alkylbenzene, a trialkylphosphate, a triarylphosphate, a phthalic acid ester, an arylsulfonic acid ester having a viscosity-density constant (VDC) of at least 0.86 that is miscible with a polyorganosiloxanes and catalyst component (C), a polyorganosiloxane devoid of reactive groups and having a viscosity of less than 2000 mPa·s at 25° C., or a combination of two or more thereof.

7. The composition of claim 1, wherein the composition is provided as a one part composition.

8. The composition of claim 1, wherein the composition is a two-part composition comprising:
  (i) a first portion comprising the siloxane polymer component (A), optionally the filler component (E),
  (ii) a second portion comprising the crosslinker (B), the catalyst component (C), the adhesive promoter (D), and the acidic compound (F)
whereby (i) and (ii) are stored separately until applied for curing by mixing of the components (i) and (ii).

9. The two-part composition of claim 8 where:
portion (i) comprises 100 pt. wt. of component (A), and 0 to 70 pt. wt. of component (E); and
portion (ii) comprises 0.1 to 10 pt. wt. of at least one crosslinker (B), 0.01 to 7 pt. wt. of a catalyst (C), 0 to 5 pt. wt. of an adhesion promoter (D), and 0.01 to about 1 pt. wt. component (F).

10. A method of providing a cured material comprising combining the first portion and the second portion of claim 8 and curing the mixture.

11. A method of providing a cured material comprising combining the first portion and the second portion of claim 9 and curing the mixture.

12. A method of providing a cured material comprising exposing the composition of claim 1 to ambient air, whereby the composition is stored in a sealed cartridge or flexible bag having outlet nozzles for extrusion and/or shaping of the uncured composition prior to cure.

13. A cured polymer material formed from the composition of claim 1 in the form of an elastomeric or duromeric seal, an adhesive, a coating, an encapsulant, a shaped article, a mold, and an impression material.

* * * * *